United States Patent
Fensel et al.

(10) Patent No.: US 6,933,007 B2
(45) Date of Patent: Aug. 23, 2005

(54) METHOD OF FORMING AN IMPROVED ROOFING MATERIAL

(75) Inventors: Fred A. Fensel, Shaker Heights, OH (US); John Palladino, Chagrin Falls, OH (US); Melissa A. Rus, Richmond Heights, OH (US)

(73) Assignee: The Garland Company, Inc., Cleveland, OH (US)

( * ) Notice: Subject to any disclaimer, the term of this patent is extended or adjusted under 35 U.S.C. 154(b) by 13 days.

(21) Appl. No.: 10/421,386

(22) Filed: Apr. 23, 2003

(65) Prior Publication Data

US 2003/0198736 A1 Oct. 23, 2003

Related U.S. Application Data

(62) Division of application No. 10/188,722, filed on Jul. 2, 2002, now abandoned.
(60) Provisional application No. 60/347,714, filed on Jan. 11, 2002.

(51) Int. Cl.[7] .............................. B05D 1/12; B05D 5/06
(52) U.S. Cl. ....................... 427/186; 427/188; 427/202; 427/204; 427/205
(58) Field of Search ................................ 427/186–188, 427/202, 204, 205

(56) References Cited

U.S. PATENT DOCUMENTS

| | | | |
|---|---|---|---|
| 1,913,667 A | 6/1933 | Harshberger | |
| 2,133,988 A | 10/1938 | Harshberger | |
| 2,332,219 A | 10/1943 | Harshberger | |
| 2,379,358 A | 6/1945 | Jewett | |
| 3,255,031 A | 6/1966 | Lodge et al. | |
| 3,479,201 A | 11/1969 | Sloan | |
| 3,528,842 A | 9/1970 | Skadulis | |
| 3,856,545 A | * | 12/1974 | Ferrigno |

(Continued)

OTHER PUBLICATIONS

Specification Sheet entitled *3M Roofing Granules Specifications—#11 Grade*; Revised Feb. 22, 2000.
Specification Sheet entitled *3M Roofing Granules Specifications—#14 Grade*; Revised Apr. 27, 2000.
Specification Sheet entitled *90A Grog*; revised Jun. 1999.
Product Bulletin entitled *SM–47 Mullite Sintered Mullite*.
Brochure entitled *ISP Mineral Roofing Granules*.
Product Data Sheet entitled *Tabular Alumina ; T–1064*.
Article from *Professional Roofing, Jan. 2001*, entitled *Revisiting Reflective Roof Surfaces*.
Article entitled *Cool Roofs Save Energy* by Hashem Akbari, Ph. D.

*Primary Examiner*—Fred J. Parker
(74) *Attorney, Agent, or Firm*—Fay Sharpe Fagan Minnich & McKee; Brian E. Turung; Robert V. Vickers

(57) ABSTRACT

A method of coating highly reflective granules on an adhering material of a roofing or siding material to form a roofing or siding material having an average resulting reflectivity on an upper surface of at least about 45%. The method includes the selecting of highly reflective granules and applying the highly reflective granules on an adhering material until over about 95% of a top surface of the adhering material is covered by the granules.

54 Claims, 3 Drawing Sheets

U.S. PATENT DOCUMENTS

| | | | |
|---|---|---|---|
| 4,120,132 | A | 10/1978 | Kendrick |
| 4,288,959 | A | 9/1981 | Murdock |
| 4,478,869 | A | 10/1984 | Brady et al. |
| 4,617,198 | A | 10/1986 | Overturf |
| 5,088,259 | A | 2/1992 | Myers |
| 5,380,552 | A * | 1/1995 | George et al. |
| 5,474,838 | A | 12/1995 | Callaway et al. |
| 5,540,971 | A | 7/1996 | Daurer et al. |
| 5,573,810 | A | 11/1996 | Grubka |
| 5,695,373 | A | 12/1997 | Blackmore et al. |
| 5,813,176 | A | 9/1998 | Tzeng et al. |
| 5,965,626 | A | 10/1999 | Tzeng et al. |
| 6,110,846 | A | 8/2000 | Brzozowski et al. |
| 6,194,519 | B1 | 2/2001 | Blalock et al. |
| 6,207,593 | B1 | 3/2001 | Fields |
| 6,235,372 | B1 | 5/2001 | Joedicke |
| 6,296,912 | B1 | 10/2001 | Zickell |
| 6,296,921 | B1 | 10/2001 | Blackmore et al. |
| 6,341,462 | B2 | 1/2002 | Kiik et al. |
| 6,360,511 | B1 | 3/2002 | Brzozowski et al. |
| 6,423,129 | B1 * | 7/2002 | Fitzgibbons, Jr. |
| 6,548,145 | B2 | 4/2003 | Joedicke |
| 6,607,781 | B2 | 8/2003 | Joedicke |

* cited by examiner

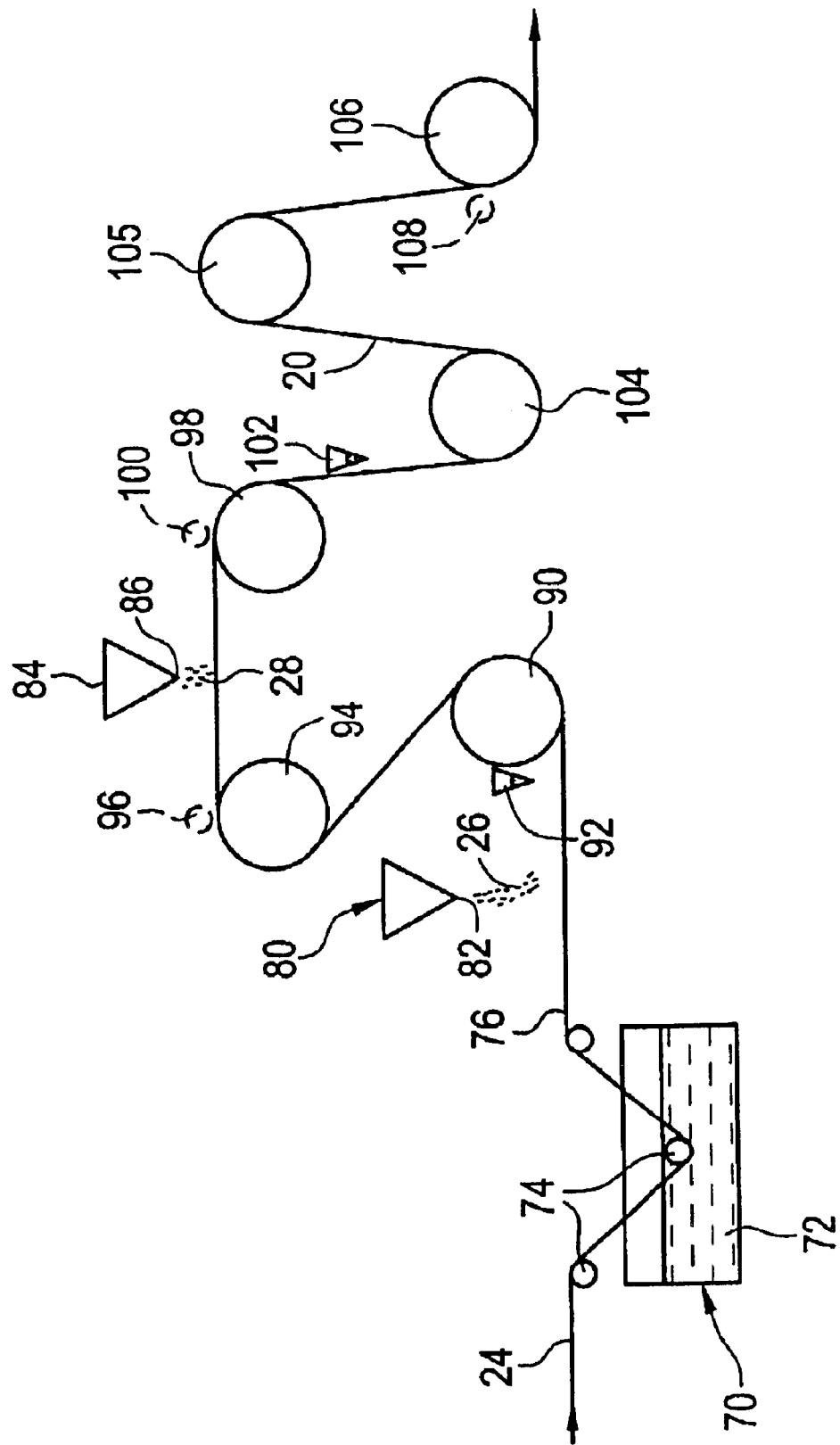

METHOD OF FORMING AN IMPROVED ROOFING MATERIAL

The present invention is a divisional of U.S. application Ser. No. 10/188,722 filed Jul. 2, 2002, now abandoned, which in turn claims priority on U. S. Provisional Patent Application Ser. No. 60/347,714 filed Jan. 11, 2002 entitled "Roof With Highly-Reflective Particles", now abandoned, which is incorporated herein by reference.

The present invention relates to a roofing and/or siding materials, and more particularly to improved roofing and/or siding materials having increased reflectivity.

INCORPORATION BY REFERENCE

U.S. Pat. Nos. 2,379,358; 3,255,031; 3,479,201; 3,528,842; 4,120,132; 4,288,959; 4,478,869; 5,088,259; 5,474,838; 5,540,971; 5,573,810; 5,695,373; 5,813,176; 5,965,626; 6,110,846; 6,194,519; 6,207,593; 6,296,912; 6,296,921; 6,341,462; and 6,360,511 are incorporated herein by reference to illustrate various types of roofing and/or siding systems on which the granular material of the present invention can be used, to also illustrate various manufacturing techniques for making such roofing and/or siding systems, and/or to further illustrate various types of prior art granules.

BACKGROUND OF THE INVENTION

Weather resistant granules of various hues, embedded on the surface of various types of roofing and/or siding, have been used extensively to provide an aesthetically pleasing color to such surfaces. In North America, asphalt-based roofing materials are a popular medium for covering roofs of homes and other structures. Asphalt-based roofing materials typically come in shingle or roll form, the shingle being the more widely used material. A typical asphalt shingle has an asphalt substrate and a multitude of granules placed thereon. The granules are generally embedded in the asphalt coating on the surface of an asphalt-impregnated base material such as roofing felt. The granules, which are embedded in one surface of the asphalt-impregnated and/or asphalt-coated fiber sheet material, form a coating to provide an inherently weather-resistant, fire-resistant, and/or decorative exterior surface. Because the granule coating provides the aesthetic effect observable with respect to the roofing material, the appearance of the granules is of major marketing importance. For this reason, a pigmented color coating is ordinarily applied to the granules to enhance their visual decorative effect.

The granules employed for roofing and siding are generally derived from a hard mineral base rock such as slate, basalt or nephelite. The granules are typically ground to a particle size of about 10 to about 35 US mesh. These granules, which comprise a base substrate, are then coated with a pigment composition having a thickness of about 4 to about 18 microns. Colored roofing granules are typically prepared by heating mineral rock granules of about 12–40 US mesh up to approximately 1000° F. A paint slurry containing a pigment is then applied to the heated granules in a mixer. Kaolin clay is used extensively in silicate paint formulations for coloring roofing granules. It serves as a filler, extender, moisture release agent, and reactant to aid film insolubilization during high temperature firing. Although kaolin clay is a major component of such coating formulations, it alone lacks the brightness and opacity needed to hide the dark underlying base rock of the granule. White colored roofing granule coatings using natural kaolin clay frequently require appreciable amounts of $TiO_2$ to achieve desired color specifications. White or light colored roofs are particularly favored in many areas. The $TiO_2$ is commonly used in conventional insolubilized alkali silicate coatings, such as those described in U.S. Pat. Nos. 2,379,358; 3,255,031; and 3,479,201, which are incorporated herein by reference. Other types of coating compositions have been used. For example, U.S. Pat. No. 3,528,842, which is incorporated herein by reference, discloses artificially colored roofing granules. These granules consist primarily of crushed and screened minerals, in which the granules are coated with a suitable pigment contained in an inorganic matrix or bond. Some common pigments include red iron oxide, yellow iron oxide, titanium dioxide, chrome hydrate, chrome oxide, chrome green, ultramarine blue, phthalocyanine blue and green, carbon black, metal ferrites, and mixtures thereof. The bond is usually applied in the form of a soluble silicate solution and is insolubilized either by heat treatment or by a combination of heat treatment and chemical action. Minnesota Mining and Manufacturing Company ("3M") has offered pigmented roofing granules known under the trade designations "LR-7000", "LR-7070", 3M Brand "4100", and 3M Brand "9300". These granules include multiple silicate-clay coatings which may include cuprous oxide or zinc oxide. Other types of pigment compositions include an aqueous slurry of an iron oxide pigment and a mixture of a silicate and clay.

Although the color of a particular roofing system plays an important role in determining which roofing system will be purchased by consumers, other factors are also gaining more prominence in determining the color of a particular roofing system. One such factor is the energy efficiency of the roofing system. This is of particular importance in more temperate regions, such as in the Southern and Southwest regions of the United States. Lighter colored roofs are known to reduce the roof temperature, thereby reducing the cooling costs of the roofed structure. For instance, on a 90° F. sunny day, the roof temperature of a white granular coated roof will be 20–30° F. cooler than an aluminum coated roof and 70–80° F. cooler than a black asphalt roof. As a result, the lighter colored roof system can amount to an energy savings of about 5–10%. The cooler temperature of the white roof system not only reduces the cooling costs associated with the building, but the heat generated by the white roof contributes less heat to the surrounding environment, thus improving air quality, especially in urban areas.

Typical light colored roofing systems have light colored granules which have a reflectivity of up to 30% and a prepared roofing reflectivity of up to 27%. Darker colored granules typically have a lower reflectivity and a resulting roofing reflectivity than lighter colored granules. In view of the continued demand for greater energy savings, there is a demand for a roofing system having increased reflectivity.

SUMMARY OF THE INVENTION

The present invention relates to roofing and/or siding materials and a method of making such materials having improved reflectivity, and more particularly to a granular material and method of applying the granular material to the surface of the, roofing and/or siding materials resulting in improved the roofing and/or siding reflectivity. The present invention is applicable to all types of roofing and/or siding materials including, but not limited to, shingles, cap sheet roll roofing, modified bitumen, foam roofing, built-up roofing (BUR), metal roofing and/or siding, plastic roofing and/or siding, and wood roofing and/or siding.

Roofing systems having a bitumen- or asphalt-based water-resistant layer are well-known. Due to their chemical composition, these water-resistant layers are highly absorptive of radiation. In fact, these roofing layers may be regarded in an uncoated state as black-body absorbers; that is, they effectively absorb almost all of the radiation that impinges upon them. Such asphalt surfaces absorb radiation, thereby resulting in increased temperature which can result in thermal degradation of the roofing system and/or increase the cooling costs of the roofed structure. In warmer regions, the bitumen- or asphalt-based layer can be heated to temperatures that significantly soften the bitumen- or asphalt-based water-resistant layer, thereby exposing the softened layer to damage by foot traffic, as well as damage to an individual's shoes. As a result of these undesirable consequences of bitumen- or asphalt-based roofing coatings, a layer of granules is typically applied to the surface of the bitumen- or asphalt-based layer. The granules have been found to increase the life of the bitumen- or asphalt-based layer, and in some cases, reduce the temperature of the roof surface when exposed to the sunlight. The granules are also used to alter the appearance of the roof surface, provide weather protection to the roof surface, improve the fire rating of the roofing surface, reduce photo degradation of the roofing surface, improve impact resistance of the roofing surface (e.g. hail damage, foot traffic), improve slip resistance of the roofing surface, and/or provide an anti-blocking effect when the roofing material is rolled after manufacture. As a result, it is now common to embed a layer of roofing granules in an exposed surface of such a roofing system, whether that system be discrete membrane panels such as shingles, rolled membrane products (e.g. modified bitumen, cap sheet roll roofing), or formed in place membranes, such as are formed by mopping liquid bitumen- or asphalt based roofing material atop a roofing base.

Roofing and/or siding shingles and cap sheet roll roofing and/or siding usually employ a web of fibrous base material. The base material typically is a nonwoven fabric such as, but not limited to, felt (organic, glass fiber, polyester, polypropylene, etc.), fiberglass, or similar materials, which are coated with a bituminous composition such as, but not limited to, bitumens, modified bitumens, tars, pitches, asphalt, and the like. The bituminous composition can include a filler such as, but not limited to, inorganic fillers or mineral stabilizers, organic materials such as polymers, recycled streams, or ground tire rubber, slate flour and/or powdered limestone. Granules are then pressed into the layer of bituminous composition while it is in a warm, softened condition. Upon cooling, the granules remain attached as a surface layer. Finely divided materials such as mica flakes, talc, silica dust or the like may be made adherent to the non-weather exposed surface of the shingle to prevent sticking of the adjacent layers of the material in packages. Examples of shingles are disclosed in U.S. Pat. Nos. 6,194,519; 6,296,912; and 6,341,462, which are incorporated herein by reference.

Modified bitumen incorporates the use of a composite fabric that is impregnated with a bituminous composition. The composite fabric typically includes a layer of woven or nonwoven material connected to a layer of low shrinkage warp strands and/or a layer of low shrinkage weft strands. The layers are typically stitched or knitted together, and the resultant fabric may be coated with a resin or sizing to prevent slippage between the several layers of the fabric and impart a measure of stiffness to the fabric. The fibers comprising the warp stands, the weft strands, and/or the woven or nonwoven material can include fibers selected from a variety of sources such as, but not limited to, natural materials, polymeric materials, inorganic materials and combinations thereof. Non-limiting examples of such fibers include polycrystalline fibers, fiberglass, thermoplastic fiber filaments (e.g., polyamide fibers of poly (p-phenylene terephthalate), poly (o-phenylene terephthalamide), ultra low shrink polyester), cotton, cellulose, natural rubber, flax, ramie, hemp, sisal, wool, linen (flax), paper, wood pulp, polyamides, polyesters, acrylics, polyolefins, polyurethanes, vinyl polymers, and derivatives and mixtures thereof. The fibers can be continuous filaments, fibers, strands and/or yarn. Like shingles, the composite fabric is coated with a bituminous material and then coated with granules that are then pressed into the layer of bituminous material while it is in a warm, softened condition. Examples of modified bitumen are disclosed in U.S. Pat. Nos. 5,474,838; 5,540,971; 5,695,373; 6,296,921, which are incorporated herein by reference.

Built-up roofing (BUR) systems generally comprise a substantially rigid deck covered with a membrane comprising one or more layers of bituminous composition impregnated felt having a separately applied coating of bituminous composition on top of each layer of felt with a protective layer of granules embedded in and covering the top bituminous composition. The granules are typically applied on the surface in bulk. BUR is used primarily on commercial buildings which have flat or low-slope roofing systems. Its popularity arises from its relatively low cost combined with its effectiveness as a water repellant membrane and its durability. Examples of BUR are disclosed in U.S. Pat. Nos. 6,360,511; 6,207,593 and 6,110,846, which are incorporated herein by reference.

Foam roofing and/or siding also are used primarily on commercial buildings which have flat or low-slope roofing systems; however, other types of surfaces can be used. The polymer foam is typically sprayed or mopped on the roof surface and granules are applied-to the polymer surface prior to the polymer fully curing. Like BUR, the granules are applied to the foam surface in bulk. Foam roofing systems may also include a layer of material (i.e. felt, board, etc.) between the foam and the granules. Examples of foam roofing are disclosed in U.S. Pat. Nos. 5,088,259; 5,813,176 and 5,965,626, which are incorporated herein by reference.

Metal, plastic and wood roofing and/or siding have also been coated with granules to provide texture, color and/or improved durability. Typically, the granules are adhered to the metal, plastic and wood roofing and/or siding by the use of an adhesive such as, but not, limited to, polymer adhesives, glue, bitumen, asphalt, etc. Examples of metal, plastic and wood roofing and/or siding are disclosed in U.S. Pat. Nos. 4,120,132 and 4,288,959, which are incorporated herein by reference.

The white granules which can be applied to roofing and/or siding systems typically have a reflectivity of about 28–30%, which results in the roof and/or siding system having an effective or resulting reflectivity of about 25–27%. Granules having a color other than white generally have a reflectivity of less than about 28–30%, thereby resulting in a roof and/or siding system having an effective or resulting reflectivity of less than about 25–27%. The present invention is particularly directed to a roofing and/or siding system that has a resulting reflectivity of over about 30% and will be particularly described with reference thereto. As can be appreciated, the invention has a broader scope in that the improved product and method of increasing surface reflectivity can be used in other applications such as, but not limited to, streets, sidewalks, parking lots, driveways, runways, steps, landscape stones, and other types of structures. The improved reflectivity of the roofing and/or siding system provides several benefits to the roofing heretofore not obtained in prior roofing and/or siding systems. The increased reflectivity of the roofing and/or siding system reduces the temperature of the surface of the roofing and/or siding system, especially on warm, sunny days. The reduced surface temperature of the roofing and/or siding system reduces the amount of heat transfer from the surface of the roofing and/or siding system to the structure positioned adjacent the roofing and/or siding system. As a result, less energy is required to maintain the structure adjacent the roofing and/or siding system at a cooler temperature. The reduced surface temperature of the roofing and/or siding system also reduces the contribution of the roofing and/or siding system as an urban heat island, which can have negative effect on air quality in urban areas. As a result, the improved roofing and/or siding system is more environmentally friendly. The increased reflectivity of the roofing and/or siding system also increases the life of the roofing and/or siding system. Increased roof temperatures result in the increased rate of degradation to the materials that make of the roofing and/or siding system (e.g. bitumen, asphalt, woven materials, nonwoven materials, adhesives, etc.). In addition to the adverse of effects of high temperatures, sunlight, especially UV light, can increase the rate of degradation of the materials that make up the roofing and/or siding system. The improved reflectivity of the roofing and/or siding system of the present invention increases the life of the roofing and/or siding system by reducing the surface temperature of the roofing and/or siding system, thus reducing the rate of thermal degradation. The improved reflectivity of the roofing and/or siding system of the present invention also increases the life of the roofing and/or siding system by reducing the amount of sunlight that penetrates into the surface of the roofing and/or siding system. In one aspect of the present invention, the average resulting reflectivity of the roofing and/or siding system is over about 30%. In one embodiment of the present invention, the average resulting reflectivity of the roofing and/or siding system is over about 30 to about 99.9%. In another and/or alternative aspect of this embodiment of the invention, the average resulting reflectivity of the roofing and/or siding system is about 35–99.9%. In still another and/or alternative aspect of this embodiment of the invention, the average resulting reflectivity of the roofing and/or siding system is about 40–95%. In yet another and/or alternative aspect of this embodiment of the invention, the average resulting reflectivity of the roofing and/or siding system is about 45–99.9%. In still yet another and/or alternative aspect of this embodiment of the invention, the average resulting reflectivity of the roofing and/or siding system is about 50–99.9%. In a further and/or alternative aspect of this embodiment of the invention, the average resulting reflectivity of the roofing and/or siding system is about 50–95%. In still a further and/or alternative aspect of this embodiment of the invention, the average resulting reflectivity of the roofing and/or siding system is about 51–95%. In yet a further and/or alternative aspect of this embodiment of the invention, the average resulting reflectivity of the roofing and/or siding system is about 52–95%. In still yet a further and/or alternative aspect of this embodiment of the invention, the average resulting reflectivity of the roofing and/or siding system is about 53–95%. In another and/or alternative aspect of this embodiment of the invention, the average resulting reflectivity of the roofing and/or siding system is about 54–95%. In still another and/or alternative aspect of this embodiment of the invention, the average resulting reflectivity of the roofing and/or siding system is about 55–95% in yet another and/or alternative aspect of this embodiment of the invention, the average resulting reflectivity of the roofing and/or siding system is about 56–95%. In still yet another and/or alternative aspect of this embodiment of the invention, the average resulting reflectivity of the roofing and/or siding system is about 57–95%. In a further and/or alternative aspect of this embodiment of the invention, the average resulting reflectivity of the roofing and/or siding system is about 58–95%. In still a further and/or alternative aspect of this embodiment of the invention, the average resulting reflectivity of the roofing and/or siding system is about 59–95%. In yet a further and/or alternative aspect of this embodiment of the invention, the average resulting reflectivity of the roofing and/or siding system is about 60–95%. In still yet a further and/or alternative aspect of this embodiment of the invention, the average resulting reflectivity of the roofing and/or siding system is about 61–95%. In another and/or alternative aspect of this embodiment of the invention, the average resulting reflectivity of the roofing and/or siding system is about 62–95%. In still another and/or alternative aspect of this embodiment of the invention, the average resulting reflectivity of the roofing and/or siding system is about 63–95%. In yet another and/or alternative aspect of this embodiment of the invention, the average resulting reflectivity of the roofing and/or siding system is about 64–95%. In still yet another and/or alternative aspect of this embodiment of the invention, the average resulting reflectivity of the roofing and/or siding system is about 65–95%. In a further and/or alternative aspect of this embodiment of the invention, the average resulting reflectivity of the roofing and/or siding system is about 50–90%. In still a further and/or alternative aspect of this embodiment of the invention, the average resulting reflectivity of the roofing and/or siding system is over about 50 to about 85%. In yet a further and/or alternative aspect of this embodiment of the invention, the average resulting reflectivity of the roofing and/or siding system is over about 50 to about 80%. In still yet a further and/or alternative aspect of this embodiment of the invention, the average resulting reflectivity of the roofing and/or siding system is over about 50 to about 75%. In another and/or alternative aspect of this embodiment of the invention, the average resulting reflectivity of the roofing and/or siding system is over about 50 to about 70%. In still another and/or alternative aspect of this embodiment of the invention, the average resulting reflectivity of the roofing and/or siding system is over about 50 to about 65%. In another and/or alternative embodiment of the present invention, the average reflectivity of the granules is at least about 35%. The granules that are applied to the roofing and/or siding system can be the same type of granule, or can be a mixture of different types, textures, shapes, and/or colors of granules. Generally, the average reflectiveness of the granules is greater than the average resulting reflectivity of the roofing and/or siding system, since the roofing and/or siding system surface is typically not fully covered with granules; thus some of the light is absorbed in these uncovered regions. In one aspect of this embodiment of the invention, the average reflectivity of the granules is about 35–99.9%. In another and/or alternative aspect of this embodiment of the invention, the average reflectivity of the granules is about 40–99.9%. In still another and/or alternative aspect of this embodiment of the invention, the average reflectivity of the granules is about 45–99.9%. In yet another and/or alternative aspect of this embodiment of the invention, the average reflectivity of the granules is about 50–99.9%. In still yet another and/or alternative aspect of this embodiment of the invention, the average reflectivity of the granules is about 55–99.9%. In a further and/or alternative aspect of this embodiment of the invention, the average reflectivity of the granules is about 60–99.9%. In still a further another and/or alternative aspect of this embodiment of the invention, the average reflectivity of the granules is over about 60 to about 99.9%. In yet a further and/or alternative aspect of this embodiment of the invention, the average reflectivity of the granules is about 65–99.9%. In still yet a further and/or alternative aspect of this embodiment of the invention, the average reflectivity of the granules is about 65–99%. In another and/or alternative aspect of this embodiment of the invention, the average reflectivity of the granules is about 65–98%. In still another and/or alternative aspect of this embodiment of the invention, the average reflectivity of the granules is about 65–95%. In yet another and/or alternative aspect of this embodiment of the invention, the average reflectivity of the granules is about 66–95%. In still yet another and/or alternative aspect of this embodiment of the invention, the average reflectivity of the granules is about 67–95%. In a further and/or alternative aspect of this embodiment of the invention, the average reflectivity of the granules is about 68–95%. In still a further and/or alternative aspect of this embodiment of the invention, the average reflectivity of the granules is about 69–95%. In still yet further and/or alternative aspect of this embodiment of the invention, the average reflectivity of the granules is about 70–95%. In another and/or alternative aspect of this embodiment of the invention, the average reflectivity of the granules is about 65–90%. In still another and/or alternative aspect of this embodiment of the invention, the average reflectivity of the granules is about 65–85%. In yet another and/or alternative aspect of this embodiment of the invention, the average reflectivity of the granules is about 70–85%. In still another and/or alternative embodiment of the present invention, the granules can have one or more colors. Typically, lighter colors have a higher degree of reflectivity. The color distribution used on a particular roofing or siding system can be used to control the degree of reflectivity of the roofing or siding system, as well as selecting an aesthetically pleasing color for the roofing or siding system. In one aspect of this embodiment, a single color of granules is primarily used in the roofing or siding system. In another and/or alternative aspect of this embodiment, multiple colors of granules are used in the roofing or siding system. In still another and/or alternative aspect of this embodiment, white colored granules are primarily used in the roofing or siding system.

In another and/or alternative aspect of the present invention, the granules applied to the roofing and/or siding system have an average hardness of over about 3 Moh's hardness. The Moh's hardness scale is commonly used to grade the hardness of minerals. The Moh's hardness ranges from 0 to 10, with 0 being a liquid and 10 being a diamond. A Moh's hardness of 3 is typically associated with calcite, while a Moh's hardness of 4 is typically associated with fluorite. The hardness of the granules is important as to the durability of the roofing and/or siding system. It is not uncommon for individuals to traverse a roof surface to effect repairs to the roof and/or other structures on the roof. A granular material having a Moh's hardness of 3 or less is highly susceptible to being-crushed as an individual walks on the granular surface. The crushing of the granular material can result in the dislodging and/or destruction of the granules on the roof surface, thereby resulting in the less reflective material located below the granules being exposed to sunlight. The crushed and/or dislodged granules can also result in the defacement of the roofing and/or siding system, thereby resulting in a less aesthetically pleasing roof surface. The damage to the granules can further result in a shortened life of the roof system. In one embodiment, the average hardness of the granules on the roofing and/or siding system is over about 3 Moh's. The granules that are applied to the roofing and/or siding system can be about the same hardness, or can be a mixture of different hardnesses. In one aspect of this embodiment, the average hardness of the granules on the roofing and/or siding system is over about 3 to about 10 Moh's hardness. In another and/or alternative aspect of this embodiment, the average hardness of the granules on the roofing and/or siding system is about 3.5–10 Moh's hardness. In still another and/or alternative aspect of this embodiment, the average hardness of the granules on the roofing and/or siding system is about 4–10 Moh's hardness. In yet another and/or alternative aspect of this embodiment, the average hardness of the granules on the roofing and/or siding system is over about 4 to about 10 Moh's hardness. In still yet another and/or alternative aspect of this embodiment, the average hardness of the granules on the roofing and/or siding system is about 4.1–10 Moh's hardness. In a further and/or alternative aspect of this embodiment, the average hardness of the granules on the roofing and/or siding system is about 4.2–10 Moh's hardness. In still a further and/or alternative aspect of this embodiment, the average hardness of the granules on the roofing and/or siding system is about 4.3–10 Moh's hardness. In yet a further and/or alternative aspect of this embodiment, the average hardness of the granules on the roofing and/or siding system is about 4.4–10 Moh's hardness. In still yet a further and/or alternative aspect of this embodiment, the average hardness of the granules on the roofing and/or siding system is about 4.5–10 Moh's hardness. In another and/or alternative aspect of this embodiment, the average hardness of the granules on the roofing and/or siding system is about 4.6–10 Moh's hardness. In still another and/or alternative aspect of this embodiment, the average hardness of the granules on the roofing and/or siding system is about 4.7–10 Moh's hardness. In yet another and/or alternative aspect of this embodiment, the average hardness of the granules on the roofing and/or siding system is about 4.8–10 Moh's hardness. In still yet another and/or alternative aspect of this embodiment, the average hardness of the granules on the roofing and/or siding system is about 4.9–10 Moh's hardness. In a further and/or alternative aspect of this embodiment, the average hardness of the granules on the roofing and/or siding system is about 5–10 Moh's hardness. In still a further and/or alternative aspect of this embodiment, the average hardness of the granules on the roofing and/or siding system is about 5.5–10 Moh's hardness. In yet a further and/or alternative aspect of this embodiment, the average hardness of the granules on the roofing and/or siding system is about 6–10 Moh's hardness. In a still yet further and/or alternative aspect of this embodiment, the average hardness of the granules on the roofing and/or siding system is about 6.5–10 Moh's hardness. In another and/or alternative aspect of this embodiment, the average hardness of the granules on the roofing and/or siding system is about 7–10 Moh's hardness. In still another and/or alternative aspect of this embodiment, the average hardness of the granules on the roofing and/or siding system is about 7–9.5 Moh's hardness. In yet another and/or alternative aspect of this embodiment, the average hardness of the granules on the roofing and/or siding system is about 7–9 Moh's hardness.

In still another and/or alternative aspect of the present invention, the average porosity of the granules is low. Granules that are highly porous can cause several problems. One such problem is the absorption of water, oils and/or dirt by the granules. The absorption of oil and/or dirt can cause discolorization of the granules, thereby resulting an a less aesthetically pleasing roofing and/or siding system. The high porosity of the granules can also result in the accelerated degradation of the granules due to a wet/dry and/or freeze/thaw cycle when water is absorbed. Highly porous granules are susceptible to water absorption. In colder climates, the absorbed water can freeze, which can result in the fracturing of the granule. The fracturing of the granules can result in the destruction and/or dislodgement of the granules from the roofing and/or siding system, thereby reducing the life of the roofing and/or siding system. In one embodiment of the invention, the average porosity of the granules on the roofing and/or siding system is less than about 20% based on the amount of absorbed oil (e.g. mineral oil/hydrocarbon solvent). The granules that are applied to the roofing and/or siding system can be the same porosity, or can be a mixture of different porosities. In one aspect of this embodiment, the average porosity of the granules on the roofing and/or siding system is less than about 20%. In another and/or alternative aspect of this embodiment, the average porosity of the granules on the roofing and/or siding system is less than about 15%. In still another and/or alternative aspect of this embodiment, the average porosity of the granules on the roofing and/or siding system is about 0–15%. In yet another and/or alternative aspect of this embodiment, the average porosity of the granules on the roofing and/or siding system is about 0–12%. In still yet another and/or alternative aspect of this embodiment, the average porosity of the granules on the roofing and/or siding system is about 0–10%. In a further and/or alternative aspect of this embodiment, the average porosity of the granules on the roofing and/or siding system is about 0–8%. In still a further and/or alternative aspect of this embodiment, the average porosity of the granules on the roofing and/or siding system is about 0–5%. In yet a further another and/or alternative aspect of this embodiment, the average porosity of the granules on the roofing and/or siding system is about 0.01–5%. In still yet a further another and/or alternative aspect of this embodiment, the average porosity of the granules on the roofing and/or siding system is about 0.01–4%. In another and/or alternative aspect of this embodiment, the average porosity of the granules on the roofing and/or siding system is about 0.5–4%. In still another and/or alternative aspect of this embodiment, the average porosity of the granules on the roofing and/or siding system is about 1–4%. In yet another and/or alternative aspect of this embodiment, the average porosity of the granules on the roofing and/or siding system is about 1–3%.

In yet another and/or alternative aspect of the present invention, the opacity of the granules is sufficiently high to limit the amount of light passing through the granules. Certain types of light are known to cause accelerated degradation of the bitumen and/or asphalt of a roofing and/or siding system. Some studies have indicated light having a wavelength of 2900–4500 Å is capable of oxidizing the oil phase of the bitumen and/or asphalt coating (commonly referred to as "asphalt "rust"), resulting in the bitumen and/or asphalt coating being washed away. The degradation of the bitumen and/or asphalt not only damages the roofing and/or siding system, but such degradation also allows the granules on the bitumen and/or asphalt to become dislodged, thereby furthering the rate of degradation of the roofing and/or siding system. In one embodiment, the average opacity of the granules is over about 50%. The granules that are applied to the roofing and/or siding system can be the same opacity, or can be a mixture of different opacities. In one aspect of this embodiment, the average opacity of the granules is at least about 55%. In another and/or alternative aspect of this embodiment, the average opacity of the granules is at least about 60%. In still another and/or alternative aspect of this embodiment, the average opacity of the granules is at least about 65%. In yet another and/or alternative aspect of this embodiment, the average opacity of the granules is at least about 70%. In a further and/or alternative aspect of this embodiment, the average opacity of the granules is at least about 75%. In still a further and/or alternative aspect of this embodiment, the average opacity of the granules is at least about 80%. In yet a further and/or alternative aspect of this embodiment, the average opacity of the granules is at least about 85%. In still yet a further and/or alternative aspect of this embodiment, the average opacity of the granules is at least about 90%. In another and/or alternative aspect of this embodiment, the average opacity of the granules is at least about 92%. In still another and/or alternative aspect of this embodiment, the average opacity of the granules is at least about 94%. In yet another and/or alternative aspect of this embodiment, the average opacity of the granules is at least about 95%. In still yet another and/or alternative aspect of this embodiment, the average opacity of the granules is at least about 96%. In a further and/or alternative aspect of this embodiment, the average opacity of the granules is at least about 98%. In still a further and/or alternative aspect of this embodiment, the average opacity of the granules is at least about 99%. In another and/or alternative embodiment of the present invention, the granules have an average reflectivity light with a wavelength of 2900–4500 Å of at least about 50%. In one aspect of this embodiment, the granules have an average reflectivity light with a wavelength of 2900–4500 Å of about 55–100%. In another and/or alternative aspect of this embodiment, the granules have an average reflectivity light with a wavelength of 2900–4500 Å of about 60–100%. In still another and/or alternative aspect of this embodiment, the granules have an average reflectivity light with a wavelength of 2900–4500 Å of about 65–100%. In yet another and/or alternative aspect of this embodiment, the granules have an average reflectivity light with a wavelength of 2900–4500 Å of about 70–100%. In still yet another and/or alternative aspect of this embodiment, the granules have an average reflectivity light with a wavelength of 2900–4500 Å of about 75–100%. In a further and/or alternative aspect of this embodiment, the granules have an average reflectivity light with a wavelength of 2900–4500 Å of about 75–100%. In still a further and/or alternative aspect of this embodiment, the granules have an average reflectivity light with a wavelength of 2900–4500 Å of about 80–100%. In yet a further and/or alternative aspect of this embodiment, the granules have an average reflectivity light with a wavelength of 2900–4500 Å of about 85–100%. In still yet a further and/or alternative aspect of this embodiment, the granules have an average reflectivity light with a wavelength of 2900–4500 Å of about 90–100%. In another and/or alternative aspect of this embodiment, the granules have an average reflectivity light with a wavelength of 2900–4500 Å of about 92–100%. In still another and/or alternative aspect of this embodiment, the granules have an average reflectivity light with a wavelength of 2900–4500 Å of about 94–100%. In yet another and/or alternative aspect of this embodiment, the granules have an average reflectivity light with a wavelength of 2900–4500 Å of about 95–100%. In still yet another and/or alternative aspect of this embodiment, the granules have an average reflectivity light with a wavelength of 2900–4500 Å of about 96–100%. In a further and/or alternative aspect of this embodiment, the granules have an average reflectivity light with a wavelength of 2900–4500 Å of about 97–100%. In still a further and/or alternative aspect of this embodiment, the granules have an average reflectivity light with a wavelength of 2900–4500 Å of about 98–100%. In yet a further and/or alternative aspect of this embodiment, the granules have an average reflectivity light with a wavelength of 2900–4500 Å of about 99–100%.

In still yet another and/or alternative aspect of the present invention, the composition of at least a portion of the granules on the roofing and/or siding system includes aluminum such as, but not limited to, metallic aluminum, aluminum oxide, aluminum oxalate, aluminum nitride, aluminum phosphates, etc. It has been found that aluminum-containing granules have excellent properties with respect to reflectivity, hardness, porosity, and/or opacity. The aluminum-containing granules can be from a natural and/or man-made source. In one embodiment, at least about 5% of the granules on the roofing and/or siding system are granules containing aluminum. In one aspect of this embodiment, at least about 10% of the granules on the roofing and/or siding system are granules containing aluminum. In another and/or alternative aspect of this embodiment, at least about 15% of the granules on the roofing and/or siding system are granules containing aluminum. In still another and/or alternative aspect of this embodiment, at least about 20% of the granules on the roofing and/or siding system are granules containing aluminum. In yet another and/or alternative aspect of this embodiment, at least about 25% of the granules on the roofing and/or siding system are granules containing aluminum. In still yet another and/or alternative aspect of this embodiment, at least about 30% of the granules on the roofing and/or siding system are granules containing aluminum. In a further and/or alternative aspect of this embodiment, at least about 35% of the granules on the roofing and/or siding system are granules containing aluminum. In still a further and/or alternative aspect of this embodiment, at least about 40% of the granules on the roofing and/or siding system are granules containing aluminum. In yet a further and/or alternative aspect of this embodiment, at least about 45% of the granules on the roofing and/or siding system are granules containing aluminum. In still yet a further and/or alternative aspect of this embodiment, at least about 50% of the granules on the roofing and/or siding system are granules containing aluminum. In another and/or alternative aspect of this embodiment, at least a majority of the granules on the roofing and/or siding system are granules containing aluminum. In still another and/or alternative aspect of this embodiment, at least about 55% of the granules on the roofing and/or siding system are granules containing aluminum. In yet another and/or alternative aspect of this embodiment, at least about 60% of the granules on the roofing and/or siding system are granules containing aluminum. In still yet another and/or alternative aspect of this embodiment, at least about 65% of the granules on the roofing and/or siding system are granules containing aluminum. In a further and/or alternative aspect of this embodiment, at least about 70% of the granules on the roofing and/or siding system are granules containing aluminum. In still a further and/or alternative aspect of this embodiment, at least about 75% of the granules on the roofing and/or siding system are granules containing aluminum. In yet a further and/or alternative aspect of this embodiment, at least about 80% of the granules on the roofing and/or siding system are granules containing aluminum. In still yet a further and/or alternative aspect of this embodiment, at least about 85% of the granules on the roofing and/or siding system are granules containing aluminum. In another and/or alternative aspect of this embodiment, at least about 90% of the granules on the roofing and/or siding system are granules containing aluminum. In still another and/or alternative aspect of this embodiment, at least about 92% of the granules on the roofing and/or siding system are granules containing aluminum. In yet another and/or alternative aspect of this embodiment, at least about 94% of the granules on the roofing and/or siding system are granules containing aluminum. In still yet another and/or alternative aspect of this embodiment, at least about 95% of the granules on the roofing and/or siding system are granules containing aluminum. In a further and/or alternative aspect of this embodiment, at least about 96% of the granules on the roofing and/or siding system are granules containing aluminum. In still a further and/or alternative aspect of this embodiment, at least about 98% of the granules on the roofing and/or siding system are granules containing aluminum. In yet a further and/or alternative aspect of this embodiment, at least about 99% of the granules on the roofing and/or siding system are granules containing aluminum. In still yet a further and/or alternative aspect of this embodiment, at least about 99.5% of the granules on the roofing and/or siding system are granules containing aluminum. In another and/or alternative embodiment of the present invention, the aluminum content of the aluminum-containing granules constitutes at least about 10 weight percent. In one aspect of this embodiment, the aluminum content of the aluminum-containing granules constitutes at least about 15 weight percent. In still another and/or alternative aspect of this embodiment, the aluminum content of the aluminum-containing granules constitutes at least about 20 weight percent. In yet another and/or alternative aspect of this embodiment, the aluminum content of the aluminum-containing granules constitutes at least about 25 weight percent. In still yet another and/or alternative aspect of this embodiment, the aluminum content of the aluminum-containing granules constitutes at least about 30 weight percent. In a further and/or alternative aspect of this embodiment, the aluminum content of the aluminum-containing granules constitutes at least about 35 weight percent. In still a further and/or alternative aspect of this embodiment, the aluminum content of the aluminum-containing granules constitutes at least about 40 weight percent. In yet a further and/or alternative aspect of this embodiment, the aluminum content of the aluminum-containing granules constitutes at least about 45 weight percent. In still yet a further and/or alternative aspect of this embodiment, the aluminum content of the aluminum-containing granules constitutes at least about 50 weight percent. In another and/or alternative aspect of this embodiment, the aluminum content of the aluminum-containing granules constitutes at least a majority weight percent. In still another and/or alternative aspect of this embodiment, the aluminum content of the aluminum-containing granules constitutes at least about 55 weight percent. In yet another and/or alternative aspect of this embodiment, the aluminum content of the aluminum-containing granules constitutes at least about 60 weight percent. In still yet another and/or alternative aspect of this embodiment, the aluminum content of the aluminum-containing granules constitutes at least about 65 weight percent. In a further and/or alternative aspect of this embodiment, the aluminum content of the aluminum-containing granules constitutes at least about 70 weight percent. In still a further and/or alternative aspect of this embodiment, the aluminum content of the aluminum-containing granules constitutes at least about 75 weight percent. In yet a further and/or alternative aspect of this embodiment, the aluminum content of the aluminum-containing granules constitutes at least about 80 weight percent. In still yet a further and/or alternative aspect of this embodiment, the aluminum content of the aluminum-containing granules constitutes at least about 85 weight percent. In another and/or alternative aspect of this embodiment, the aluminum content of the aluminum-containing granules constitutes at least about 90 weight percent. In still another and/or alternative aspect of this embodiment, the aluminum content of the aluminum-containing granules constitutes at least about 92 weight percent. In yet another and/or alternative aspect of this embodiment, the aluminum content of the aluminum-containing granules constitutes at least about 94 weight percent. In still yet another and/or alternative aspect of this embodiment, the aluminum content of the aluminum-containing granules constitutes at least about 95 weight percent. In a further and/or alternative aspect of this embodiment, the aluminum content of the aluminum-containing granules constitutes at least about 96 weight percent. In still a further and/or alternative aspect of this embodiment, the aluminum content of the aluminum-containing granules constitutes at least about 98 weight percent. In still yet another and/or alternative aspect of this embodiment, the aluminum content of the aluminum-containing granules constitutes at least about 99 weight percent. In still another and/or alternative embodiment of the present invention, the aluminum-containing granules include both aluminum (e.g., metallic aluminum, aluminum oxide, aluminum oxalate, aluminum nitride, aluminum phosphate, etc.) and silicon (e.g., metallic silicon, silicon carbide, silicon dioxide, etc.). In one aspect of this embodiment, the aluminum plus silicon content of the aluminum-containing granules is at least about 70 weight percent. In another- and/or alternative aspect of this embodiment, the aluminum plus silicon content of the aluminum-containing granules is at least about 75 weight percent. In still another and/or alternative aspect of this embodiment, the aluminum plus silicon content of the aluminum-containing granules is at least about 80 weight percent. In yet another and/or alternative aspect of this embodiment, the aluminum plus silicon content of-the aluminum-containing granules is at least about 85 weight percent. In still yet another and/or alternative aspect of this embodiment, the aluminum plus silicon content of the aluminum-containing granules is at least about 90 weight percent. In a further and/or alternative aspect of this embodiment, the aluminum plus silicon content of the aluminum-containing granules is at least about 91 weight percent. In still a further and/or alternative aspect of this embodiment, the aluminum plus silicon content of the aluminum-containing granules is at least about 92 weight percent. In yet a further and/or alternative aspect of this embodiment, the aluminum plus silicon content of the aluminum-containing granules is at least about 93 weight percent. In still yet a further and/or alternative aspect of this embodiment, the aluminum plus silicon content of the aluminum-containing granules is at least about 94 weight percent. In another and/or alternative aspect of this embodiment, the aluminum plus silicon content of the aluminum-containing granules is at least about 95 weight percent. In still another and/or alternative aspect of this embodiment, the aluminum plus silicon content of the aluminum-containing granules is at least about 96 weight percent. In yet another and/or alternative aspect of this embodiment, the aluminum plus silicon content of the aluminum-containing granules is at least about 97 weight percent. In still yet another and/or alternative aspect of this embodiment, the aluminum plus silicon content of the aluminum-containing granules is at least about 98 weight percent. In a further and/or alternative aspect of this embodiment, the aluminum plus silicon content of the aluminum-containing granules is at least about 99 weight percent. In another and/or alternative aspect of this embodiment, the ratio of aluminum content to silicon content of the aluminum-containing granules is at least about 0.1–100000:1. In still another and/or alternative aspect of this embodiment, the ratio of aluminum content to silicon content of the aluminum-containing granules is at least about 0.5–100000:1. In yet another and/or alternative aspect of this embodiment, the ratio of aluminum content to silicon content of the aluminum-containing granules is at least about 1–100000:1. In still yet another and/or alternative aspect of this embodiment, the ratio of aluminum content to silicon content of the aluminum-containing granules is at least about 1.1–50000:1. In a further and/or alternative aspect of this embodiment, the ratio of aluminum content to silicon content of the aluminum-containing granules is at least about 1.5–50000:1. In still a further and/or alternative aspect of this embodiment, the ratio of aluminum content to silicon content of the aluminum-containing granules is at least about 2–10000:1. In yet a further and/or alternative aspect of this embodiment, the ratio of aluminum content to silicon content of the aluminum-containing granules is at least about 5–10000:1. In still yet a further and/or alternative aspect of this embodiment, the ratio of aluminum content to silicon content of the aluminum-containing granules is at least about 10–10000:1. In another and/or alternative aspect of this embodiment, the ratio of aluminum content to silicon content of the aluminum-containing granules is at least about 0.2–5000:1. In still another and/or alternative aspect of this embodiment, the ratio of aluminum content to silicon content of the aluminum-containing granules is at least about 0.5–5000:1. In yet another and/or alternative aspect of this embodiment, the ratio of aluminum content to silicon content of the aluminum-containing granules is at least about 0.8–5000:1. In still yet another and/or alternative aspect of this embodiment, the ratio of aluminum content to silicon content of the aluminum-containing granules is at least about 0.8–4000:1. In a further and/or alternative aspect of this embodiment, the ratio of aluminum content to silicon content of the aluminum-containing granules is at least about 1–3500:1.

In a further and/or alternative aspect of the present invention, the roofing and/or siding system is coated by a multiple granular coating method. Prior methods of coating shingles, modified bitumen, and/or cap sheet roll roofing involved the use of a single size range of material applied to the asphalt or bitumen layer. In most coating processes, a single layer of granular material was applied to the asphalt or bitumen layer. In other processes, two layers of granular material were coated onto the asphalt or bitumen layer. This dual layer coating process was used to form special shading on the roofing materials or to apply microorganism resistant granules and colored granules to the roofing materials. Such dual coating processes are disclosed in U.S. Pat. Nos. 4,478,869 and 5,573,810, which are incorporated herein by reference. In all these prior coating processes, the granules in each coating layer were substantially the same size. The industry standard for granules coated on shingles, modified bitumen, and/or cap sheet roll roofing is typically No. 11 grade granules (typically 8×40 US mesh having an average particle size of about 19 US mesh (i.e. 937 mm sieve designation)). This size of granules typically coats about 95–98% of the surface of the asphalt or bitumen layer of the roofing material. As a result, some of the asphalt or bitumen layer remains exposed, even when two coating layers of granules are used and/or the non-adhered granules are reapplied to the surface of the granular coated roofing material. An improved process and method of coating shingles, modified bitumen, and/or cap sheet roll roofing has been developed to increase the coating coverage of the asphalt or bitumen layer of the roofing material. The improved process and method includes the steps of first applying a granular material having a first average size of material, and secondly applying another layer of granular material having a second average size of material, wherein the first average size is greater than the second average size. It has been found that significantly improved coverage by the granules on the asphalt or bitumen layer of the roofing material is achieved by use of this multiple coating, multiple granule size coating process. As can be appreciated, more than two coating layers can be applied to the asphalt or bitumen layer of the roofing material. However, if more than two layers are applied to the asphalt or bitumen layer of the roofing material, the last coating layer typically includes the smaller-sized granules. The multiple coating, multiple granule size coating process can also used on other types of roofing and/or siding systems wherein an adhesive is typically used to secure the granules to the roofing material (e.g., metal roofing, plastic roofing, wood roofing). Furthermore, the multiple coating, multiple granule size coating process can be used on BUR and foam roofing and/or siding systems. In these two types of roofing and/or siding systems, the granular material is typically applied in bulk until the asphalt or bitumen layer or foam layer is fully covered with the granular material. As a result, much of the top layer of granules is spaced from and does not adhere to the asphalt or bitumen layer or foam layer. By use of the multiple coating, multiple granule size coating process of the present invention, a reduction in the amount of granular material can be used without any or any significant reduction in granular coverage on the asphalt or bitumen layer or foam layer. Consequently, a material cost savings can be achieved, in addition to reducing the load on the roof surface. It has been found that the multiple coating, multiple granule size coating process can increase the average resulting reflectivity of the roofing and/or siding system without use of any special roofing granules. In some cases, the average resulting reflectivity of the roofing and/or siding system can be increased by 5% or more. In one embodiment of the present invention, at least one coating layer is formed by granules having an average particle size of larger than about 30 US mesh, and at least one other coating layer is formed by granules having an average particle size of less than about 30 US mesh. As can be appreciated, different size ranges of granules can be used on different types of roofing and/or siding systems. For instance, BUR systems may use granules having an average particle size that is greater that the average particle size of granules used on shingles. As a result, the average particle size of the of the granules will typically depend on the type of roofing and/or siding system, and/or the desired end use of the roofing and/or siding system. An important aspect of this embodiment is that the average particle size of at least one layer of granules is less than the average particle size of another layer of granules. In one aspect of this embodiment, at least one coating layer is formed by granules having an average particle size of larger that about 25 US mesh, and at least one other coating layer is formed by granules having an average particle size of less than about 35 US mesh. In another and/or alternative aspect of this embodiment, at least one coating layer is formed by granules having an average particle size of about 2.5–25 US mesh, and at least one other coating layer is formed by granules having an average particle size of 30–100 US mesh. In still another and/or alternative aspect of this embodiment, at least one coating layer is formed by granules having an average particle size of greater than about 20 US mesh, and at least one other coating layer is formed by granules having an average particle size of less than about 35 US mesh. In one particular non-limiting example, at least one coating layer is formed by No. 11 grade granules having an average particle size of about 19 US mesh (i.e. 937 mm sieve designation), and at least one other coating layer is formed by granules having a particle designation of 40×70 having an average particle size of about 47 US mesh (i.e. 330 mm sieve designation). In another particular non-limiting example, at least one coating layer is formed by No. 14 grade granules having an average particle size of about 22 US mesh (i.e. 754 mm sieve designation), and at least one other coating layer is formed by granules having a particle designation of 40×70 having an average particle size of about 47 US mesh (i.e. 330 mm sieve designation). In still another particular non-limiting example, at least one coating layer is formed by 12×40 designated granules having an average particle size of about 19 US mesh (i.e. 958 mm sieve designation), and at least one other coating layer is formed by granules having a particle designation of 40×70 having an average particle size of about 47 US mesh (i.e. 330 mm sieve designation). In yet anther particular non-limiting example, at least one coating layer is formed by No. 11 grade granules having an average particle size of about 19 US mesh (i.e. 937 mm sieve designation), and at least one other coating layer is formed by granules having a particle designation of 28×48 having an average particle size of about 50 US mesh (i.e. 304 mm sieve designation). In still yet anther particular non-limiting example, at least one coating layer is formed by No. 14 grade granules having an average particle size of about 22 US mesh (i.e. 754 mm sieve designation), and at least one other coating layer is formed by granules having a particle designation of 28×48 having an average particle size of about 50 US mesh (i.e. 304 mm sieve designation). In a further particular non-limiting example, at least one coating layer is formed by 12×40 designated granules having an average particle size of about 19 US mesh (i.e. 958 mm sieve designation), and at least one other coating layer is formed by granules having a particle designation of 28×48 having an average particle size of about 50 US mesh (i.e. 304 mm sieve designation). In another and/or alternative embodiment of the invention, the ratio of the average particle size of at least one layer of granules to the average particle size of at least one other layer of granules is at least about 1.3:1. In one aspect of this embodiment, the ratio of the average particle size of at least one layer of granules to the average particle size of at least one other layer of granules is about 1.5–50:1. In another and/or alternative aspect of this embodiment, the ratio of the average particle size of at least one layer of granules to the average particle size of at least one other layer of granules is about 1.5–25:1. In still another and/or alternative aspect of this embodiment, the ratio of the average particle size of at least one layer of granules to the average particle size of at least one other layer of granules is about 1.5–20:1. In yet another and/or alternative aspect of this embodiment, the ratio of the average particle size of at least one layer of granules to the average particle size of at least one other layer of granules is about 1.5–10:1. In still yet another and/or alternative aspect of this embodiment, the ratio of the average particle size of at least one layer of granules to the average particle size of at least one other layer of granules is about 1.5–5:1. In a further and/or alternative aspect of this embodiment, the ratio of the average particle size of at least one layer of granules to the average particle size of at least one other layer of granules is about 1.75–5:1. In still a further and/or alternative aspect of this embodiment, the ratio of the average particle size of at least one layer of granules to the average particle size of at least one other layer of granules is about 1.75–4:1. In yet a further and/or alternative aspect of this embodiment, the ratio of the average particle size of at least one layer of granules to the average particle size of at least one other layer of granules is about 2–3.5:1. In still yet a further and/or alternative aspect of this embodiment, the ratio of the average particle size of at least one layer of granules to the average particle size of at least one other layer of granules is about 2.1–3.3:1.

In a further and/or alternative aspect of the present invention, the coverage percentage of the granules adhered to the roofing and/or siding system by use of the multiple coating, multiple granule size coating process is over about 95%. In one aspect of this embodiment, the coverage percentage of the granules adhered to the roofing and/or siding system by use of the multiple coating, multiple granule size coating process is over about 96%. In another and/or alternative aspect of this embodiment, the coverage percentage of the granules adhered to the roofing and/or siding system by use of the multiple coating, multiple granule size coating process is over about 97%. In still another and/or alternative aspect of this embodiment, the coverage percentage of the granules adhered to the roofing and/or siding system by use of the multiple coating, multiple granule size coating process is over about 98%. In yet another and/or alternative aspect of this embodiment, the coverage percentage of the granules adhered to the roofing and/or siding system by use of the multiple coating, multiple granule size coating process is at least about 98.1%. In still yet another and/or alternative aspect of this embodiment, the coverage percentage of the granules adhered to the roofing and/or siding system by use of the multiple coating, multiple granule size coating process is at least about 98.2%. In a further and/or alternative aspect of this embodiment, the coverage percentage of the granules adhered to the roofing and/or siding system by use of the multiple coating, multiple granule size coating process is at least about 98.3%. In still a further and/or alternative aspect of this embodiment, the coverage percentage of the granules adhered to the roofing and/or siding system by use of the multiple coating, multiple granule size coating process is at least about 98.4%. In yet a further and/or alternative aspect of this embodiment, the coverage percentage of the granules adhered to the roofing and/or siding system by use of the multiple coating, multiple granule size coating process is at least about 98.5%. In still yet a further and/or alternative aspect of this embodiment, the coverage percentage of the granules adhered to the roofing and/or siding system by use of the multiple coating, multiple granule size coating process is at least about 98.6%. In another and/or alternative aspect of this embodiment, the coverage percentage of the granules adhered to the roofing and/or siding system by use of the multiple coating, multiple granule size coating process is at least about 98.7%. In still another and/or alternative aspect of this embodiment, the coverage percentage of the granules adhered to the roofing and/or siding system by use of the multiple coating, multiple granule size coating process is at least about 98.8%. In yet another and/or alternative aspect of this embodiment, the coverage percentage of the granules adhered to the roofing and/or siding system by use of the multiple coating, multiple granule size coating process is at least about 98.9%. In still yet another and/or alternative aspect of this embodiment, the coverage percentage of the granules adhered to the roofing and/or siding system by use of the multiple coating, multiple granule size coating process is at least about 99%. In a further and/or alternative aspect of this embodiment, the coverage percentage of the granules adhered to the roofing and/or siding system by use of the multiple coating, multiple granule size coating process is at least about 99.1%. In still a further and/or alternative aspect of this embodiment, the coverage percentage of the granules adhered to the roofing and/or siding system by use of the multiple coating, multiple granule size coating process is at least about 99.2%. In yet a further and/or alternative aspect of this embodiment, the coverage percentage of the granules adhered to the roofing and/or siding system by use of the multiple coating, multiple granule size coating process is at least about 99.3%. In still yet a further and/or alternative aspect of this embodiment, the coverage percentage of the granules adhered to the roofing and/or siding system by use of the multiple coating, multiple granule size coating process is at least about 99.4%. In another and/or alternative aspect of this embodiment, the coverage percentage of the granules adhered to the roofing and/or siding system by use of the multiple coating, multiple granule size coating process is at least about 99.5%. In still another and/or alternative aspect of this embodiment, the coverage percentage of the granules adhered to the roofing and/or siding system by use of the multiple coating, multiple granule size coating process is at least about 99.6%. In yet another and/or alternative aspect of this embodiment, the coverage percentage of the granules adhered to the roofing and/or siding system by use of the multiple coating, multiple granule size coating process is at least about 99.7%. In still yet another and/or alternative aspect of this embodiment, the coverage percentage of the granules adhered to the roofing and/or siding system by use of the multiple coating, multiple granule size coating process is at least about 99.8%. In a further and/or alternative aspect of this embodiment, the coverage percentage of the granules adhered to the roofing and/or siding system by use of the multiple coating, multiple granule size coating process is at least about 99.9%. In still a further and/or alternative aspect of this embodiment, the coverage percentage of the granules adhered to the roofing and/or siding system by use of the multiple coating, multiple granule size coating process is at least about 99.92%. In yet a further and/or alternative aspect of this embodiment, the coverage percentage of the granules adhered to the roofing and/or siding system by use of the multiple coating, multiple granule size coating process is at least about 99.94%. In still yet a further and/or alternative aspect of this embodiment, the coverage percentage of the granules adhered to the roofing and/or siding system by use of the multiple coating, multiple granule size coating process is at least about 99.95%. In another and/or alternative aspect of this embodiment, the coverage percentage of the granules adhered to the roofing and/or siding system by use of the multiple coating, multiple granule size coating process is at least about 99.96%. In still another and/or alternative aspect of this embodiment, the coverage percentage of the granules adhered to the roofing and/or siding system by use of the multiple coating, multiple granule size coating process is at least about 99.98%. In yet another and/or alternative aspect of this embodiment, the coverage percentage of the granules adhered to the roofing and/or siding system by use of the multiple coating, multiple granule size coating process is at least about 99.99%.

It is a principal object of the present invention to provide an improved roofing and/or siding system.

Another and/or alternative object of the present invention is the provision of a roofing and/or siding system that has improved reflectivity.

Still another and/or alternative object of the present invention is the provision of a roofing and/or siding system having an exposed surface of highly reflective, wear-resistant granules.

Yet another and/or alternative object of the present invention is the provision of a roofing and/or siding system wherein a bitumen- or asphalt-based layer is covered in at least significant portion by granules that are highly reflective to sunlight.

Still yet another and/or alternative object of the present invention is the provision of a roofing and/or siding system including granules that are reflective with regard to those portions of the electromagnetic spectrum which are particularly harmful to a bitumen- or asphalt-based layer.

A further and/or alternative object of the present invention is the provision of a roofing and/or siding system which includes granules having high weather resistant properties such as resistance to oxidation, UV exposure, and wet/dry or freeze/thaw cycling.

Still a further and/or alternative object of the present invention is the provision of a roofing and/or siding system that includes a granular coating which possesses superior weatherability, good tint strength and color stability as well as heat stability.

Yet a further and/or alternative object of the present invention is the provision of a roofing and/or siding system that is commercially feasible and economical to manufacture.

Another and/or alternative object of the present invention is the provision of a roofing and/or siding system that includes granules that readily adhere to a bitumen- or asphalt-based layer with a limited degree of adhesive failure.

Still another and/or alternative object of the present invention is the provision of a roofing and/or siding system that includes granules having a sufficient hardness to resist damage from walking traffic.

Yet another and/or alternative object of the present invention is the provision of a roofing and/or siding system that includes granules having a low porosity.

Still yet another and/or alternative object of the present invention is the provision of a roofing and/or siding system that includes granules that can be applied to a variety of roofing and/or siding systems.

A further and/or alternative object of the present invention is the provision of a roofing and/or siding system that includes a significant amount of aluminum.

Still a further and/or alternative object of the present invention is the provision of a roofing and/or siding system having an improved average reflectivity.

Yet a further and/or alternative object of the present invention is the provision of a roofing and/or siding system that is coated by a multi-coating process.

Still yet a further and/or alternative object of the present invention is the provision of a roofing and/or siding system that has improved granular coverage.

Another and/or alternative object of the present invention is the provision of a roofing and/or siding system that has a reduced surface temperature when exposed to sunlight.

Still another and/or alternative object of the present invention is the provision of a roofing and/or siding system that reduces energy costs associated with the cooling of a structure.

Yet another and/or alternative object of the present invention is the provision of a roofing and/or siding system that resists heat degradation.

Still yet another and/or alternative object of the present invention is the provision of a roofing and/or siding system that includes granules having a longer life.

These and other objects and advantages will become apparent to those skilled in the art upon reading and following the description taken together with the accompanying drawings.

BRIEF DESCRIPTION OF THE DRAWINGS

Reference may now be made to the drawings which illustrate various preferred embodiments that the invention may take in physical form and in certain parts and arrangement of parts wherein:

FIG. 2A is an elevation view of an alternative apparatus utilizing the coating method of the present invention;

DETAILED DESCRIPTION OF THE PREFERRED EMBODIMENTS

Figure 1:
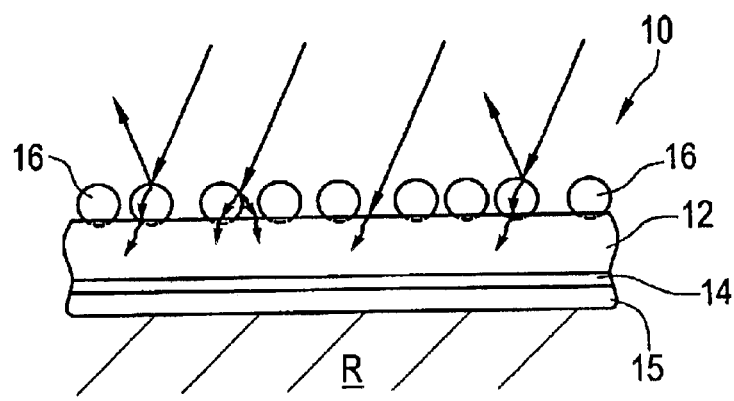
FIG. 1 is a side sectional view of a prior art roofing and/or siding system.

Referring now to the drawings wherein the showings are for the purpose of illustrating a preferred embodiment of the invention only and not for the purpose of limiting same, FIG. 1 illustrates a prior art roofing system 10. The roofing system 10 is secured to a roof, roof substrate (e.g., base sheets), or subroof R by any suitable arrangement. The roofing system 10 is a shingle that includes a bitumen- or asphalt-based material 12, 15, a reinforcement material 14 therebetween, and layer of granules 16. The reinforcement material 14 is typically a felt or fiberglass material that is commonly used in the art. The reinforcement material 14 is shown as being fully embedded in the bitumen- or asphalt-based material 12. The granules 16 are illustrated as being partially embedded and secured in the bitumen- or asphalt-based material 12. The granules are typical granules used in roofing materials. The granules are generally derived from a mineral base rock such as greenstone, greystone, nephylene syenite, gravel slate, gannister, granite, quartzite, andosite, rhyolite and the like. The granules may be coated to color the granules and/or provide the granules with antimicrobial resistance. Examples of such granules are ceramic coated minerals sold by 3M.

As illustrated in FIG. 1, the granules 16 are shown to be spherical and have the same size. In practice, the granules have a variety of different shapes and not all of the granules are the same size. One common size of granules used on shingles is No. 11 grade particles. No. 11 grade particles are known in the industry to have a particle range of about 8×40 US mesh having an average mesh size of about 19 US mesh (i.e. 937 mm sieve designation). Referring again to FIG. 1, much of the exposed surface of bitumen- or asphalt-based material 12 is covered by granules 16; however, there exists spaces between some of the granules. Typically about 95–98% of the exposed surface of bitumen- or asphalt-based material 12 is covered by granules 16. These spaces allow sunlight as indicated by the arrows to bypass the granules and contact the upper surface of bitumen- or asphalt-based material 12. The exposure of the bitumen- or asphalt-based material 12 to the sunlight results in absorption of the sunlight by the bitumen- or asphalt-based material 12, as indicated by the arrows, which in turn increases the rate of degradation to the bitumen- or asphalt-based material 12. The degradation of the bitumen- or asphalt-based material 12 reduces the life of the roofing and/or siding system 10. The degradation of the bitumen- or asphalt-based material 12 also accelerates the release of granules from the bitumen- or asphalt-based material 12, thereby allowing for further absorption of the sunlight, including UV light, by the bitumen- or asphalt-based material 12. The absorption of sunlight by the bitumen- or asphalt-based material 12 results in an increased temperature of the roofing and/or siding system 10, which temperature increase also accelerates the degradation of the bitumen- or asphalt-based material 12.

Referring again to FIG. 1, granules 16 are illustrated as reflecting some of the sunlight and allowing a portion of the sunlight to be transmitted through the granules, as indicated by the arrows, which is then absorbed by the bitumen- or asphalt-based material 12. As stated above, the absorption of sunlight by the bitumen- or asphalt-based material 12 accelerates the degradation of the bitumen- or asphalt-based material 12. The absorption of sunlight also results in an increase in surface temperature of the roofing system. Typical surface temperatures of roof systems on a clear, 90° F. day exceed about 155° F. These high surface temperatures result in increased rates of degradation of the roofing system, and increased cooling costs of the roofed structure.

Figure 3:
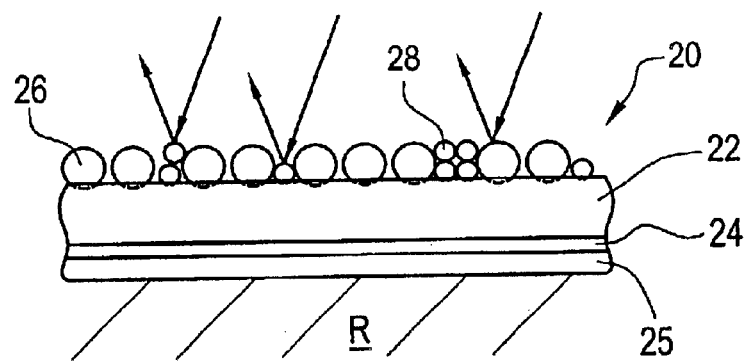
FIG. 3 is a side sectional view of a roofing and/or siding system incorporating the present invention.

Referring now to FIG. 3, a roofing and/or siding system 20, in accordance with one embodiment of the invention, is illustrated. The roofing and/or siding system 20 is secured to a roof, roof substrate, and/or subroof R by any suitable arrangement. As can be appreciated, roofing and/or siding system 20 can be secured to other surfaces such as, but not limited to, the side of a structure, the floor of a structure, a deck, a street, a sidewalk, a parking lot, a driveway, the ground, etc. The roofing and/or siding system 20 includes a top layer of bituminous composition 22, a reinforcement material 24, a bottom layer of bituminous composition 25, and granules 26. The roofing and/or siding system 20 can be roofing shingles, cap sheet roll roofing, modified bitumen, or built-up roofing (BUR). The bituminous composition is typically bitumen and/or asphalt; however, other or additional constituents known in the art can be used. The thickness of the bituminous composition is selected to meet the desired end use of the roofing and/or siding system 20. The reinforcement material 24 can be any known composite material, felt or fiberglass material, or additional or other material that is known in the art. The composition, thickness, and/or arrangement of the reinforcement material 24 is selected to meet the desired end use of the roofing and/or siding system 20. For a modified bitumen roofing and/or siding system, reinforcement material 24 is typically a composite material. For a shingles, cap sheet roll or BUR roofing and/or siding systems, reinforcement material 24 is typically a felt or fiberglass fiber material. The reinforcement material 24 is illustrated as being fully embedded between the top and bottom layers of bituminous composition; however, this is not required. For instance, the bottom layer of bituminous composition can be eliminated. In addition, the composite material may only be partially embedded in the bituminous composition. As can also be appreciated, additional layers of composite material and/or bituminous composition can be used. The upper surface of the top layer of bituminous composition 22 includes two different sizes of granules 26, 28. Most of granules 26, 28 are illustrated as being partially embedded and secured in the upper surface of bituminous composition 22. As can be appreciated, some of granules 26, 28 may be fully embedded in the bituminous composition and/or not embedded in the bituminous composition to meet the desired end use of the roofing and/or siding system 20. As illustrated in FIG. 3, granules 26 are substantially spherical and have the same size. In practice, the granules have a variety of different shapes and not all of the granules are the same size. The size of granules 26 is an illustrated average size of the granules. Likewise, granules 28 are shown to be spherical and have the same size. In practice, the granules have a variety of different shapes and not all of the granules are the same size. The size of granules 28 is an illustrated average size of the granules, which average size is less than the average size of granules 26.

Granules 26, 28 are made or and/or are coated with a highly reflective material that reflects most, if not all, of the sunlight that contacts the granules as shown by the arrows. Most, if not all, of the upper surface of bituminous composition 22 is covered by the granules, thereby preventing most, if not all, of the sunlight directed toward the roofing and/or siding system 20 from being absorbed by the bituminous composition 22.

Referring again to FIG. 3, the smaller granules 28 occupy the spaces between the larger granules 26, thereby increasing the amount of coverage of the upper surface of the bituminous composition 22. The increased amount of granule coverage on the upper surface of the bituminous composition 22 is a significant improvement over prior art roofing and/or siding system 20 as shown in FIG. 1. The increased coverage of the upper surface of the bituminous composition 22 reduces the rate of degradation of the bituminous composition 22, reduces the surface temperature of the roofing and/or siding system, extends the life of the roofing system, and/or results in a more aesthetically pleasing surface color. The increased coverage provided by the granules typically results in a 1–5% or more increase in reflectivity of the roofing and/or siding system. The size of granules 26 is selected to meet the desired end use of the roofing and/or siding system 20. One non-limiting example for shingles, cap sheet roll or modified bitumen roofing and/or siding systems is to use No. 11 grade particles or No. 14 grade particles (particle range of 12–40 US mesh and an average US mesh size of 22 US mesh (i.e. 754 mm sieve designation)) for granules 26 and to use 28×48 designated particles having an average US mesh size of about 50 US mesh (i.e. 304 mm sieve designation) for granules 28. As can be appreciated, other sized particles can be used for granules 26 and/or granules 28. For BUR roofing and/or siding systems, one non-limiting example is to use a particle range of 2.5–9 US mesh having an average US mesh size of 3.5 US mesh for granules 26 and No. 11 grade particles for granules 28. As can be appreciated, other sized particles can be used for granules 26 and/or granules 28. It is not uncommon that the mean diameter of the granules for BUR roofing and/or siding systems exceed 1 inch. Granules larger than 0.25 inch in diameter are commonly referred to as gravel.

Figure 2:
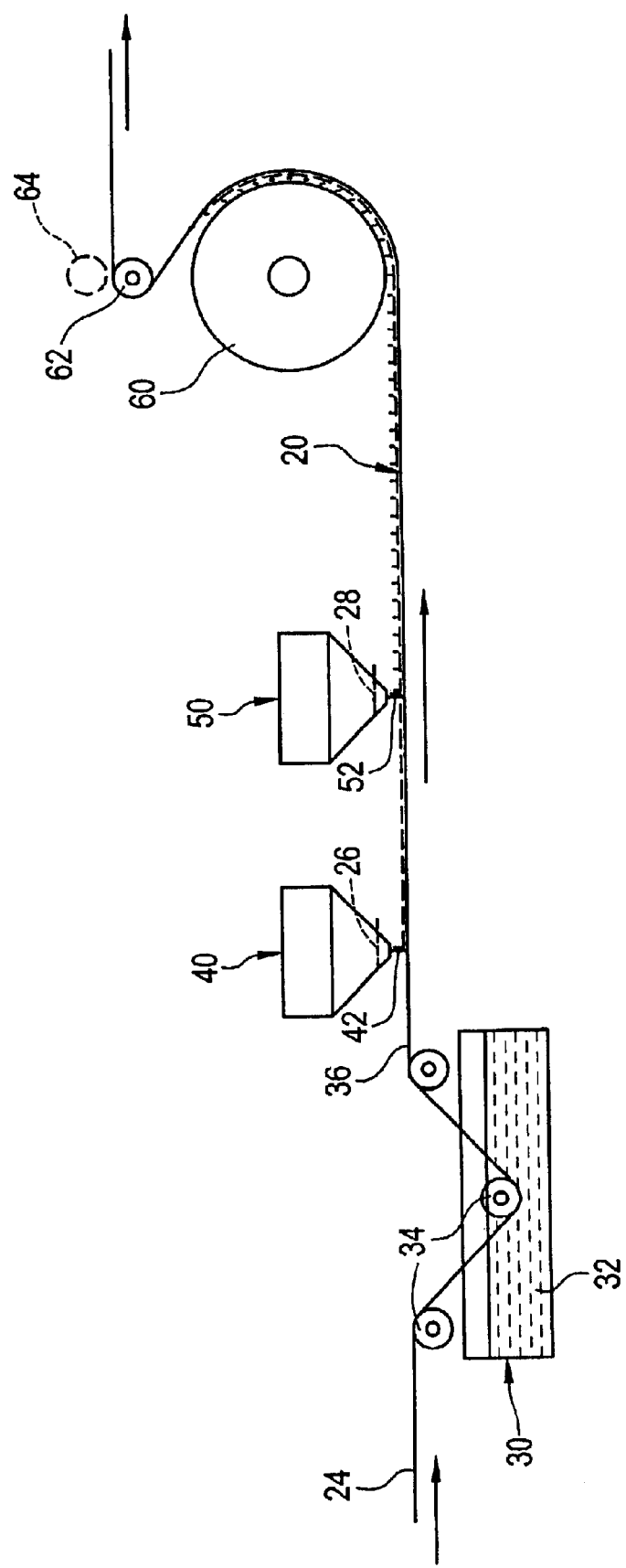
FIG. 2 is an elevation view of an apparatus utilizing the coating method of the present invention.

Referring now to FIG. 2, there is illustrated an apparatus for forming a roofing and/or siding system 20 such as shingles, cap sheet roll roofing or modified bitumen in accordance with the present invention. Reinforcement material 24 is passed through a coater 30 containing liquid bituminous composition 32 to at least partially impregnate the reinforcement material. As the reinforcement material 24 is passed through a coater 30, the reinforcement material is guided by one or more guide rollers 34. As the reinforcement material 24 passes through a coater 30, a continuous hot bituminous coated strip 36 is formed. The bituminous coated strip is then passed beneath a hopper 40 which applies granules 26 (primary granules) on the upper surface of the bituminous coated strip. A gate 42 controls the amount of granules 26 that is deposited on the upper surface of the bituminous coated strip. The amount of granules 26 deposited on the upper surface of the bituminous coated strip is typically selected to substantially fully cover the upper surface of the bituminous coated strip; however, other amounts of granules 26 can be used. The coverage of granules 26 on the upper surface of the bituminous coated strip is generally represented by the coverage of granules 16 in FIG. 1. For instance, when No. 11 grade granules are used, the coverage provided by the granules is typically about 95–98% (ASTM D6225). After granules 26 have been deposited on the upper surface of the bituminous coated strip, granules 28 (secondary granules) are then deposited on the upper surface of the bituminous coated strip as the bituminous coated strip passes under hopper 50. The amount of granules 28 deposited on the upper surface of the bituminous coated strip from hopper 50 is controlled by gate 52. The amount of granules 28 deposited on the upper surface of the bituminous coated strip is typically selected to substantially fully cover the exposed upper surface of the bituminous coated strip; however, other amounts of granules 28 can be used. Typically, the amount of granules 28 deposited on the upper surface of the bituminous coated strip is less than the amount of granules 26 deposited on the upper surface of the bituminous coated strip. The smaller sized granules 28 are deposited on the upper surface of the bituminous coated strip between previously deposited granules 26. After the smaller sized granules 28 are deposited on the upper surface of the bituminous layer, less than about 5% of the bituminous layer remains exposed, and typically less than about 2% of the bituminous layer remains exposed. As a result of this multiple coating, multiple size granule coating process, a significantly greater portion of the upper surface of the bituminous coated strip is coated by granules. As can be appreciated, more than two layers of granules can be applied to the bituminous layer. Typically, the smaller sized granules are coated onto the bituminous layer after the larger sized particles have been applied; however, this is not required. The size ratio of granules 26 to granules 28 is at least about 1.5:1.

After the granules are deposited on the upper surface of the bituminous coated strip, the bituminous coated strip is passed around a drum 60. As the bituminous coated strip travels about drum 60, many of granules 26, 28 are at least partially pressed into the bituminous coated strip. In addition, as the bituminous coated strip travels about drum 60, loosely adhered granules 26, 28 fall from the surface of the bituminous coated strip. These granules can be disposed of and/or recycled for later use. After bituminous strip passes around drum 60, the bituminous coated strip is guided by one or more guide rollers 62 to a cooling section and/or pressing section, not shown. One or more press rollers 64 may be used to at least partially press granules 26, 28 into the bituminous layer for improved adhesion of the granules to the roofing and/or siding system. After the bituminous coated strip is cooled and/or pressed, the bituminous coated strip is rolled up and/or formed into shingles. The process steps of cooling, pressing, rolling, and shingle formation are well known in the art, thus will not be described herein.

Referring now to FIG. 2A, another apparatus is illustrated for forming a roofing and/or siding system 20 such as shingles, cap sheet roll roofing or modified bitumen in accordance with the present invention. Reinforcement material 24 is passed through a coater 70 containing liquid bituminous composition 72 to at least partially impregnate the reinforcement material. As the reinforcement material 24 is passed through a coater 70, the reinforcement material is guided by one or more guide rollers 74. As the reinforcement material 24 passes through a coater 70, a continuous hot bituminous coated strip 76 is formed.

The bituminous coated strip is then passed beneath a hopper 80 which applies granules 26 (primary granules) on the upper surface of the bituminous coated strip. A gate 82 controls the amount of granules 26 that is deposited on the upper surface of the bituminous coated strip. The amount of granules 26 deposited on the upper surface of the bituminous coated strip is typically selected to substantially fully cover the upper surface of the bituminous coated strip; however, other amounts of granules 26 can be used. The coverage of granules 26 on the upper surface of the bituminous coated strip is generally about 95–98% when No. 11 grade granules are used.

After granules 26 have been deposited on the upper surface of the bituminous coated strip, the bituminous coated strip is passed about a drum 90. As the bituminous coated strip travels about drum 90, many of granules 26 are at least partially pressed into the bituminous coated strip. In addition, as the bituminous coated strip travels about drum 90, loosely adhered granules 26 fall from the surface of the bituminous coated strip. These granules can be disposed of and/or recycled for later use. The fallen granules expose regions in the bituminous layer that are not covered by at least partially embedded granules 26. These exposed regions have been found to be more easily filled by smaller granules that are subsequently applied to the bituminous layer, as will be discussed below. It has been found that in many of the final products, there is increased coverage of the bituminous layer when loose granules 26 are removed prior to applying granules 28. As illustrated in FIG. 2A, there is a hopper 92 positioned adjacent to drum 90. Hopper 92 is used to collect the loose granules for disposal and/or for later use. As can be appreciated, the use of hopper 92 is optional.

After the bituminous coated strip passes around drum 90, the bituminous coated strip is fed to drum 94. The path of the bituminous coated strip between drums 90 and 92 is illustrated as an "S" shape; however, other shaped paths for the bituminous coated strip can be used. As the bituminous coated strip passes about drum 94, the bituminous coated strip passes under press roller 96. Press roller 96 is used to at least partially press granules 26 into the bituminous layer for improved adhesion of the granules to the roofing and/or siding system. Use of press roller 96 results in granules 26 twice being at least partially pressed into the bituminous coated strip (i.e. first by drum 90 and second by press roller 96 and drum 94). As can be appreciated, the use of press roller 96 is optional. After bituminous coated strip passes about drum 94, granules 28 (secondary granules) are then deposited on the upper surface of the bituminous coated strip as the bituminous coated strip passes under hopper 84. The amount of granules 28 deposited on the upper surface of the bituminous coated strip from hopper 84 is controlled by gate 86. The amount of granules deposited on the upper surface of the bituminous coated strip is typically selected to substantially fully cover the exposed upper surface of the bituminous coated strip; however, other amounts of granules 28 can be used. Typically, the amount of granules 28 deposited on the upper surface of the bituminous coated strip is less than the amount of granules 26 deposited on the upper surface of the bituminous coated strip. The smaller sized granules 28 are deposited on the upper surface of the bituminous coated strip between previously deposited granules 26. After the smaller sized granules 28 are deposited on the upper surface of the bituminous layer, less than about 5% of the bituminous layer remains exposed, and typically less than about 2% of the bituminous layer remains exposed. When granules having a size designation of 12×40 having an average particle size of about 19 US mesh (i.e. 958 mm sieve designation) are used for granules 26 and granules having a size designation of 40×70 having an average particle size of about 47 US mesh (i.e. 330 mm sieve designation) are used for granules 28, the coverage of the bituminous layer by granules 26, 28 is over 98%.

As can be appreciated, additional coatings of granules can be applied to the bituminous layer to attempt to increase the coverage by the granules; however, this is not required. Typically, the smaller sized granules are coated onto the bituminous layer after the larger sized particles have been applied; however, this is not required. As a result of this multiple coating, multiple size granule coating process, a significantly greater portion of the upper surface of the bituminous coated strip is coated by granules.

Referring again to FIG. 2A, after the bituminous coated strip passes under hopper 84, the bituminous coated strip travels to drum 98. Positioned adjacent to drum 98 is a press roller 100. Press roller 100 is used to at least partially press and at least partially embed newly applied granules 28 in the bituminous layer. Press roller 100 will also at least partially press and at least partially embed granules 26 in the bituminous layer. As can be appreciated, the use of press roller 100 is optional. As the bituminous coated strip passes about drum 98, loosely adhered granules 26, 28 fall from the surface of the bituminous coated strip. These granules can be disposed of and/or recycled for later use. As illustrated in FIG. 2A, there is a hopper 102 positioned adjacent to drum 98. Hopper 102 is used to collect the loose granules for disposal and/or for later use. As can be appreciated, the use of hopper 102 is optional.

Once the bituminous coated strip passes about drum 98, the bituminous coated strip guided by one or more guide rollers to a cooling section and/or pressing section. As illustrated in FIG. 2A, the bituminous coated strip passes about drums 104, 105, 106. As the bituminous coated strip passes about these drums, granules 26, 28 are further at least partially pressed and at least partially embedded in the bituminous layer, and/or loose granules fall from the bituminous coated strip. As can be appreciated, the use of drums 104, 105 and/or 106 is optional. Another press roller 106 is illustrated as being positioned adjacent to drum 106. The press roller is to used to at least partially press and at least partially embed granules 26, 28 in the bituminous layer. As can be appreciated, press roller 108 is optional.

After the bituminous coated strip is cooled and/or pressed, the bituminous coated strip is rolled up and/or formed into shingles. The process steps of cooling, pressing, rolling, and shingle formation are well known in the art, thus will not be described herein.

Figure 4:
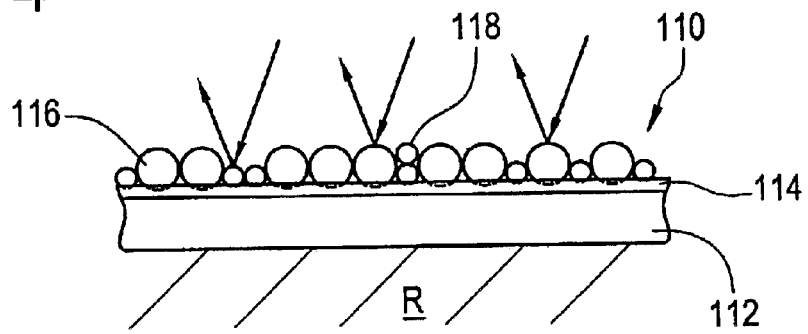
FIG. 4 is a side sectional view of another roofing and/or siding system incorporating the present invention; and, FIG. 5 is a side sectional view of still another roofing and/or siding system incorporating the present invention.

Referring now to FIG. 4, another roofing and/or siding system 110 in accordance with one embodiment of the invention is illustrated. Roofing and/or siding system 110 is a metal, plastic and/or wood roofing and/or siding system. The roofing and/or siding system 110 is secured to a roof or subroof R by any suitable arrangement. The roofing and/or siding system 110 includes a base substrate 112 such as, but not limited to, a sheet of plastic, metal or wood. The base, substrate is typically a rigid or semi-rigid structure. The thickness of the base substrate is selected to meet the desired end use of the roofing and/or siding system 110. Applied to the top surface of the base substrate is an adhesive layer 114. The adhesive layer can be formed by any type of adhesive desirable. Some non-limiting examples include polymer adhesives, glue, bitumen, asphalt, etc. The thickness of the adhesive layer is selected to meet the desired end use of the roofing and/or siding system 110. Granules 116, 118 are coated on the adhesive layer and secured to the base substrate by the adhesive layer. As can be appreciated, some of granules 116, 118 may be fully or partially embedded in the adhesive layer and/or not embedded in the adhesive layer. The composition, size, layer thickness, and/or physical properties of the granules are selected to meet the desired end use of the roofing and/or siding system 110. As illustrated in FIG. 4, granules 116 are substantially spherical and have the same size. In practice, the granules have a variety of different shapes and not all of the granules are the same size. The size of granules 116 is an illustrated average size of the granules. Likewise, granules 118 are shown to be spherical and have the same size. In practice, the granules have a variety of different shapes and not all of the granules are the same size. The size of granules 118 is an illustrated average size of the granules, which average size is less than the average size of granules 116. Granules 116, 118 are made of and/or are coated with a highly reflective material that reflects most, if not all, of the sunlight that contacts the granules as shown by the arrows. Most, if not all, of the upper surface of adhesive layer 114 is covered by the granules, thereby preventing most, if not all, of the sunlight directed toward the roofing and/or siding system 110 from contacting and/or being absorbed by the base substrate 112. As can be appreciated, the adhesive layer can be formulated so as to at least partially function as a reflective layer to further prevent sunlight from contacting and/or being absorbed by the base substrate 112.

Referring again to FIG. 4, smaller granules 118 occupy the spaces between the larger granules 116, thereby increasing the amount of coverage of the adhesive layer 112. The increased amount of granule coverage on the adhesive is a significant improvement over prior art roofing and/or siding systems. The increased coverage provided by the granules typically results in a 1–5% or more increase in reflectivity of the roofing and/or siding system. The increased coverage of the adhesive layer 114 reduces the rate of degradation of the base substrate 112, reduces the surface temperature of the roofing and/or siding system, extends the life of the roofing system, and/or results in a more aesthetically pleasing surface color. The size of granules 116 is selected to meet the desired end use of the roofing and/or siding system 110. Typically, granules 116 are No. 11 grade particles or No. 14 grade particles; however, other sizes can be used. The size of granules 118 is selected to have an average particle size of less than the average particle size of granules 116. One non-limiting example would be to use a particle designation of 12×40 having an average US mesh size of about 19 US mesh for granules 116 and a particle designation of 28×48 having an average US mesh size of about 50 US mesh (i.e. 304 mm sieve designation) for granules 118.

Figure 5:
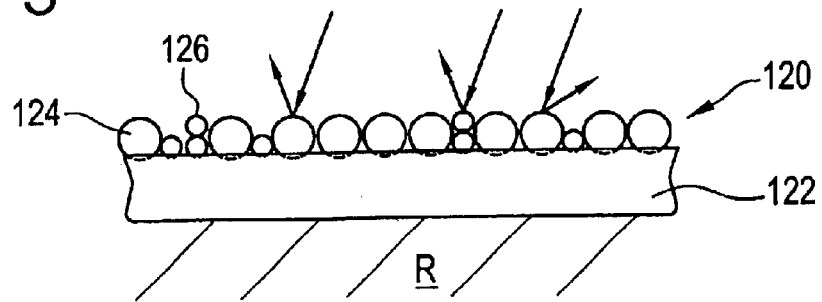

Referring now to FIG. 5, still another roofing and/or siding system 120 in accordance with one embodiment of the invention is illustrated. Roofing and/or siding system 120 is a foam roofing and/or siding system. The roofing and/or siding system 120 is secured to a roof or subroof R by foam 122. Foam 122 can be any type of foam used on roofing and/or siding systems such as, but not limited to, polyurethane materials. The foam is applied to roof or subroof R by any known method. The composition and/or thickness of the foam is selected to meet the desired end use of the roofing and/or siding system 120. Applied to the top surface of the foam are granules 124, 126. As can be appreciated, some of granules 124, 126 may be fully or partially embedded in the foam and/or not embedded in the foam. The composition, size, layer thickness, and/or physical properties of the granules are selected to meet the desired end use of the roofing and/or siding system 120. As illustrated in FIG. 5, granules 124 are substantially spherical and have the same size. In practice, the granules have a variety of different shapes and not all of the granules are the same size. The size of granules 124 is an illustrated average size of the granules. Likewise, granules 126 are shown to be spherical and have the same size. In practice, the granules have a variety of different shapes and not all of the granules are the same size. The size of granules. 126 is an illustrated average size of the granules, which average size is less than the average size of granules 124. Granules 124, 126 are made of and/or are coated with a highly reflective material that reflects most, if not all, of the sunlight that contacts the granules, as shown by the arrows. Most, if not all, of the upper surface of foam 122 is covered by the granules, thereby preventing most, if not all, of the sunlight directed toward the roofing and/or siding system 120 from contacting and/or being absorbed by the foam. As can be appreciated, the foam can be formulated so as to at least partially function as a reflective layer to further prevent sunlight from being absorbed by foam 122. As illustrated in FIG. 5, granules 124, 126 are spherical in shape; however such shape is merely representative of one of many shapes of the granules.

Referring again to FIG. 5, the smaller granules 126 occupy the spaces between the larger granules 124, thereby increasing the amount of coverage of foam 122. The increased amount of granule coverage on the foam is a significant improvement over prior art roofing and/or siding systems. The increased coverage provided by the granules typically results in a 1–5% or more increase in reflectivity of the roofing and/or siding system. The increased coverage of the foam reduces the rate of degradation of the foam, reduces the temperature of the roofing and/or siding system, extends the life of the roofing system, and/or results in a more aesthetically pleasing surface color. The size of granules 124 is selected to meet the desired end use of the roofing and/or siding system 120. Typically, granules 126 are typically No. 11 grade particles or larger; however, other sizes can be used. The size of granules 126 is selected to have an average particle size of less than the average particle size of granules 124. One non-limiting example would be to use a particle range of 2.5–9 US mesh having an average US mesh size of 3.5 US mesh for granules 124 and a particle designation of 40×70 having an average US mesh size of about 47 US mesh (i.e. 330 mm sieve designation) for granules 126.

The resulting reflectivity of the roofing and/or siding system can be further increased by the use of the novel highly reflective granules in accordance with the present invention. Prior art white granules typically have a reflectivity in the range of about 28 to about 30%, and the resulting reflectivity of the roof and/or siding system is about 25 to about 27%. Roofing and/or siding systems that include granules other than white granules typically have a lower resulting reflectivity. The lower reflectivity of these prior art granules results in higher surface temperatures and shorter life of the prior art roofing systems. The novel granules in accordance with the present invention have an average reflectivity of at least about 35%, and typically have an average reflectivity of at least about 55%, and can be as high as about 99% or greater. Typically, such highly reflective granules have a white color; however, other colors can be used. When such highly reflective granules are used in the roofing and/or siding systems as illustrated in FIGS. 3-5, the average resulting reflectivity of the roofing and/or siding system is over about 30%. In one non-limiting embodiment of the present invention, the average resulting reflectivity of the roofing and/or siding system is at least about 35%, and typically at least about 45%, move typically at least about 50%, and can be as high as 95% or greater. The significant increase in resulting reflectivity of the roofing and/or siding system by the at least partial use of the novel granules of the present invention amounts to a significant advance in the roofing industry. The increased resulting reflectivity of the roofing and/or siding system results in a reduction in the surface temperature of the roofing and/or siding system, which in turn increases the life of the roofing system, makes the roofing and/or siding system more environmentally friendly, especially in urban areas, and/or results in reduced cooling costs of structures covered by the novel roofing and/or siding system of the present invention. The novel granules of the present invention are also selected to have an average reflectivity light with a wavelength of 2900–4500 Å of at least about 50%, and typically about 55–100%. Light having a wavelength of 2900–4500 Å is known to cause accelerated degradation of the bitumen and/or asphalt of a roofing and/or siding system. The composition of the granules is selected to reduce the amount of light with a wavelength of 2900–4500 Å from penetrating the granules. It has been found that the opacity of the granules has an effect on the ability of light with a wavelength of 2900–4500 Å to penetrate the granules. The granules of the present invention generally have an average opacity of over about 50%, and typically an opacity of at least about 55% to about 100%.

The novel granules of the present invention generally have an average hardness of over about 3 Moh's hardness, and typically at least about 4 Moh's hardness and up to about 9.5 or greater Moh's hardness. The harder granules increase the durability and life of the roofing and/or siding system (i.e increase impact resistance). The novel granules also generally have an average porosity of less than 20%, and typically less than about 10–15%. Granules that are highly porous are susceptible to discolorization, and/or accelerated degradation due to wet/dry and/or freeze/thaw cycles. The novel granules are also selected to resist degradation from water and air and/or from a variety of environmental contaminants such as, but not limited to, acid rain, pollutants, fungus, bacteria, vegetation growth, animal refuse, insect secretions, etc. The novel granules can be made from natural or made-made materials. For instance, the granules can be partially or fully formed from natural minerals and/or polymers. The granules can include a base substrate, and can be coated with one or more coatings of a natural and/or man-made material.

The granules can be selected to have a high or low density, depending on the desired use of the granules for the roofing and/or siding system. The granules can also include materials that resist bacteria and/or fungus growth, and/or other types of biological growth. The shape and size of the granules in not limited other than by what is desired for a particular roofing and/or siding system.

Certain types of granules have been discovered to have highly reflective properties. These granules typically include aluminum such as, but not limited to metallic aluminum, aluminum oxide, aluminum oxalate, aluminum nitride, aluminum phosphate, etc. It has been found that aluminum-containing granules have excellent properties with respect to reflectivity, hardness, porosity, and/or opacity. The aluminum-containing granules can be of a natural and/or man-made source. When aluminum-containing granules are selected for use on a roofing and/or siding system, the aluminum content of the granules is generally at least about 5 weight percent. Granules having an aluminum content that constitutes a majority weight percent of the granules have been found to be very highly reflective to sunlight when used on roofing and/or siding materials.

Several common granules used in the roofing and/or siding industry do not fall within the scope of the novel granules of the present invention. For instance, one of the more popular granules known as Industry White (ceramic coated granite) has a reflectivity of about 25–30% (ASTM E903), and when used on a roofing and/or siding system, results in the roofing and/or siding system having a resulting reflectivity of about 23–27%. Industry White also has a high porosity of about 20%. The relatively low reflectivity of Industry White results in enhanced surface temperatures of the roofing system. Typically, a roofing system that primarily includes Industry White has a surface temperature of about 155–165° F. on a sunny day with ambient temperatures of about 90° F. The increased surface temperature of the roofing system results in an increased rate of thermal degradation of the roofing system resulting in reduced life of the roofing system, and in increased cooling costs for cooling the structure under the roofing system. Another common type of granules used is known as "Black Beauty." Black Beauty (coal slag) has a reflectivity of about 2–5%, and when used on a roofing and/or siding system, results in the roofing and/or siding system having a resulting reflectivity of about 1–3%. The low reflectivity of Black Beauty results in significantly enhanced surface temperatures of the roofing system. Typically, a roofing system that primarily includes Black Beauty has a surface temperature of about 180–200° F. on a sunny day with ambient temperatures of about 90° F. The increased surface temperature of the roofing system results in an increased rate of thermal degradation of the roofing system resulting in reduced life of the roofing system, and in increased cooling costs for cooling the structure under the roofing system. Granules formed from granite generally have a reflectivity of about 5–20%, and when used on a roofing and/or siding system, result in the roofing and/or siding system having a resulting reflectivity of about 3–17%. Dark gravel has a reflectivity of up to about 12%, and when used on a roofing and/or siding system, results in the roofing and/or siding system having a resulting reflectivity of about 8–10%. Light gravel has a reflectivity of up to about 34%, and when used on a roofing and/or siding system, results in the roofing and/or siding system having a resulting reflectivity of about 25–29%. The use of granite granules on roofing and/or siding systems also results in significantly enhanced surface temperatures of the roofing system. Typically, a roofing system that primarily includes granite granules has a surface temperature of about 165–185° F. on a sunny day with ambient temperatures of about 90° F. The increased surface temperature of the roofing system results in an increased rate of thermal degradation of the roofing system resulting in reduced life of the roofing system, and in increased cooling costs for cooling the structure under the roofing system. Granules formed from limestone have also been used to some extent. Limestone granules are softer than other types of commonly used granules. The Moh's hardness of limestone is about 2–3. Additionally, limestone is reactive with air and water, and thus degrades when exposed to air and water. Limestone is also highly reactive with acid rain, thus readily degrades in urban environments. As a result, granules made solely from limestone are not commonly used. When pure limestone granules are used, the reflectivity of the granules is about 55–60% and the resulting reflectivity on the roofing and/or siding system is up to about 45%. Roofing and/or siding systems that include limestone also result in enhanced surface temperatures of the roofing system. Typically, a roofing system that primarily includes limestone granules has a surface temperature of about 130–145° F. on a sunny day with ambient temperatures of about 90° F. The increased surface temperature of the roofing system results in an increased rate of thermal degradation of the roofing system resulting in reduced life of the roofing system, and in increased cooling costs for cooling the structure under the roofing system. Marble, which is chemically the same as limestone, is harder than limestone (about 4 Moh's hardness) and is less chemically reactive than limestone. Marble has a reflectivity of about 55–60%; however, the resulting reflectivity is about 5–10%. The significantly lower resulting reflectivity is a result of the low opacity of marble. Limestone has an opacity of about 90–95%. Marble, in a granular form, has an opacity of up to about 20%. As a result, light is readily transmitted through the marble, thereby lowering the resulting reflectivity of the marble, especially when the marble is applied to a bituminous surface. Therefore, marble is typically not used as the sole granular layer. The low opacity of the marble results in accelerated degradation of the roofing and/or siding system from the sunlight, when used as the sole granular layer. Another type of granule that has been used is ISP Ultra Brite White. These granules have a reflectivity of 44–52%, and when used on a roofing and/or siding system, result in the roofing and/or siding system having a resulting reflectivity of about 40–44%. Roofing and/or siding systems that include ISP Ultra Brite White result in increased surface temperatures of the roofing system. Typically, a roofing system that primarily includes ISP Ultra Brite White has a surface temperature of about 125–135° F. on a sunny day with ambient temperatures of about 90° F. The increased surface temperature of the roofing system results in an increased rate of thermal degradation of the roofing system resulting in reduced life of the roofing system, and in increased cooling costs for cooling the structure under the roofing system.

All these types prior art granules, except limestone and marble, have a reflectivity below 55%. In addition, all these types of granules have a resulting reflectivity, when applied to a black body such as asphalt and/or a bituminous material, of no more than 45%. As can be appreciated, these common granules, if desired, can be included with the novel granules of the present invention of roofing and/or siding systems.

Several materials have been found that can be used to form granules on roofing and/or siding systems having the desired reflectivity, hardness, porosity, and opacity. The use of these materials results in significantly improved resulting reflectivity of the roofing and/or siding system. Roofing and/or siding systems that include granules in accordance with the present invention result in reduced surface temperatures of the roofing system. Typically, a roofing system that primarily includes the granules in accordance with the present invention has a surface temperature of about 115–125° F. on a sunny day with ambient temperatures of about 90°. This reduced surface temperature of the roofing system results in a reduced rate of thermal degradation of the roofing system resulting in longer life of the roofing system, and in reduced cooling costs for cooling the structure under the roofing system.

One material that meets the criteria of the novel granules of the present invention is a material named "Grog", which is commercially available through Maryland Refractories Co. of Irondale, Ohio. Grog is a recycled alumina scrap from fire brick and kiln furnaces. Grog has an off-white color. Grog includes a majority of aluminum in the form of aluminum oxide. Grog can include other components such as silicon in the form of silica, iron oxide, calcium oxide, magnesium oxide, titanium oxide and other materials. One particular form of Grog that can be used is "90A Grog" having the following composition:

| Component | Weight % Range | Typical |
|---|---|---|
| $Al_2O_3$ | 86–93 | 89 |
| $SiO_2$ | 5–12.4 | 8.5 |
| $Fe_2O_3$ | 0.1–0.5 | 0.3 |
| CaO | 0.1–1 | 0.5 |
| MgO | 0.04–0.8 | 0.5 |
| $TiO_2$ | 0.1–1 | 0.7 |
| Alkalies | 0.1–0.5 | 0.3 |

Grog has a reflectivity of generally at least about 55%, typically at least about 60%, and more typically about 65–70%. When Grog is used on a roofing and/or siding system, the resulting reflectivity of the roofing and/or siding system is generally over about 45%, typically at least about 50%, and more typically about 56–60%. Grog generally has a hardness of at least about 5 Moh's hardness, typically at least about 6 Moh's hardness, and more typically about 7–9 Moh's hardness. Grog generally has a porosity of less than about 20%, typically less than about 10%, and more typically less than about 5%. Grog has an opacity of generally over about 80%, and typically at least about 90%. The weight percent ratio of aluminum to silicon in the Grog is generally at least about 2:1, and typically about 2.2–30:1, and more typically about 2.3–20:1. The weight percent of aluminum and silicon in the Grog is generally at least about 75%, typically at least about 85%, and more typically at least about 90%.

Another material that meets the criteria of the novel granules of the present invention is a material named "Mullite," a white calcined mineral commercially available from Hitchins Refractories of Louisville, Ky. Mullite includes a majority of aluminum and silicon in the form of aluminum oxide and silica. Mullite can include other components such as iron oxide, calcium oxide, magnesium oxide, titanium oxide, sodium oxide, potassium oxide, and other materials. One particular form of Mullite that can be used is "SM-47 Mullite" having the following composition:

| Component | Weight % Range | Typical |
|---|---|---|
| $Al_2O_3$ | at least 45 | 45.1 |
| $SiO_2$ | up to 54 | 53.1 |
| $Fe_2O_3$ | up to 0.5 | 0.29 |
| CaO | up to 0.1 | 0.09 |
| MgO | up to 0.1 | 0.05 |
| $TiO_2$ | up to 0.8 | 0.56 |
| $Na_2O$ | up to 0.05 | 0.04 |
| $K_2O$ | up to 0.03 | 0.01 |

Another particular form of Mullite that can be used is a synthetic sintered mullite commercially available from Passary Minerals Limited in India. These mullites are sold commercially under the names "Synthmul 47", "Synthmul 60", "Synthmul 70" and "High Purity". These mullites have the following composition:

| Component | Weight % Range | Typical "47" | Typical "60" | Typical "70" | Typical "HP" |
|---|---|---|---|---|---|
| $Al_2O_3$ | 45–74 | 47.2 | 60 | 70.5 | 73.16 |
| $SiO_2$ | 20–52 | 50.1 | 37.3 | 24.6 | 24.52 |
| $Fe_2O_3$ | 0.3–1.3 | 0.5 | 0.5 | 0.5 | 0.4 |
| CaO | up to 0.1 | | | | Trace |
| MgO | up to 0.1 | | | | |
| $TiO_2$ | up to 3 | 2.5 | 2.3 | 2.75 | 0.35 |
| $Na_2O + K_2O$ | up to 0.65 | | | | 0.65 |

Mullite has a reflectivity of generally at least about 55%, typically at least about 60%, and more typically about 68–70%. When Mullite is used on a roofing and/or siding system, the resulting reflectivity on the roofing and/or siding system is generally over about 45%, typically at least about 50%, and more typically about 55–65%. Mullite generally has a hardness of at least about 5 Moh's hardness, typically at least about 6 Moh's hardness, and more typically about 7–9 Moh's hardness. Mullite generally has a porosity of less than about 10%, typically less than about 6%, and more typically about 3–4%. Mullite has an opacity of generally over about 80%, and typically at least about 90%. The weight percent ratio of aluminum to silicon in the Mullite is generally at least about 0.7:1, and typically about 0.8–10:1, and more typically about 0.8–5:1. The weight percent of aluminum and silicon in the Mullite is generally at least about 80%, typically at least about 90%, and more typically at least about 93%.

Another material that meets the criteria of the novel granules of the present invention is tabular alumina commercially available from C-E Minerals, of King of Prussia, Pa. Tabular alumina is used as a ceramic raw material. Tabular alumina includes a majority of aluminum in the form of aluminum oxide. Tabular alumina can include other components such as silica, iron oxide, calcium oxide, sodium oxide, and other materials. One particular form of tabular alumina that can be used is "T-1064" having the following composition:

| Component | Weight % Range | Typical |
|---|---|---|
| $Al_2O_3$ | at least 99 | 99.7 |
| $SiO_2$ | up to 0.1 | 0.03 |
| $Fe_2O_3$ | up to 0.15 | 0.13 |
| CaO | up to 0.12 | 0.04 |
| $Na_2O$ | up to 0.35 | 0.26 |

Tabular alumina has a reflectivity of generally at least about 55%, typically at least about 65%, and more typically about 70–85%. When tabular alumina is used on a roofing and/or siding system, the resulting reflectivity on the roofing and/or siding system is generally over 45%, typically at least about 50%, and more typically about 52–60%. Tabular alumina generally has a hardness of at least about 5 Moh's hardness, typically at least about 6 Moh's hardness, and more typically about 7–9 Moh's hardness. Tabular alumina generally has a porosity of less than about 10%, typically less than about 5%, and more typically about 1–4%. Tabular alumina generally has an opacity of over about 80%, and typically at least about 90%. The weight percent ratio of aluminum to silicon in the tabular alumina is generally at least about 9:1, and typically about 15–8000:1, and more typically about 50–4000:1. The weight percent of aluminum and silicon in the tabular alumina is generally at least about 90%, typically at least about 95%, and more typically at least about 98%.

Another material that meets the criteria of the novel granules of the present invention is crushed porcelain. This material is commercially available from Aluchem Inc. of Reading, Ohio. The source of the crushed porcelain is typically from broken or recycled dinnerware. As a result, the granules of the present invention can be a recycled material. The crushed porcelain typically has an aluminum oxide content of at least about 25 weight percent. White crushed porcelain has a reflectivity of generally at least about 55%, typically at least about 60%, and typically about 65–70%, When crushed white porcelain is used on a roofing and/or siding system, the resulting reflectivity on the roofing and/or siding system is generally at over about 45%, typically at least about 48%, and more typically about 50–55%. The crushed white porcelain generally has a hardness of at least about 5 Moh's hardness, typically at least about 6 Moh's hardness, and more typically about 7–9 Moh's hardness. The crushed white porcelain generally has a porosity of less than about 10%, typically less than about 8%, and more typically less than about 5%. The crushed white porcelain generally has an opacity of over about 80%, and typically at least about 90%. The weight percent ratio of aluminum to silicon in the crushed white porcelain is generally at least about 0.2:1, and typically about 0.25–2:1, and more typically about 0.25–1:1. The weight percent of aluminum and silicon in the crushed white porcelain is generally at least about 75%, typically at least about 80%, and more typically at least about 85%. As can be appreciated, other types or white china or dinnerware can be used so long such china and dinnerware have a sufficiently high hardness, sufficient low porosity, sufficiently high opacity, and sufficiently high reflectiveness.

The invention has been described with reference to the preferred embodiment and alternatives thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

We claim:

1. A method of coating highly reflective granules on an adhering material of a roofing or siding material to form a roofing or siding material having an average resulting reflectivity on an upper surface of at least about 50% comprising:
   a) selecting a plurality of highly reflective granules, said highly reflective granules having an average reflectivity of about 55%–99.9%, an average hardness of over about 4 Moh's, an average opacity of at least about 60%, and an average porosity of about 0–15%;
   b) applying said plurality of said highly reflective granules substantially uniformly on said adhering material until over about 95% of a top surface of said adhering material is covered by said highly reflective granules, said adhering material including asphalt, bitumen, or combinations thereof; and,
   c) partially embedding a majority of said plurality of highly reflective granules in said top surface of said adhering material to prevent most of said highly reflective granules from being fully embedded in said upper surface so that said highly reflective granules achieve an average resulting reflectivity on said upper surface of at least about 50%.

2. The method as defined in claim 1, wherein said step of applying includes dropping said highly reflective granules onto said top surface of said adhering material at a height that only causes said partial embedding of most of said highly reflective granules in said top surface of said adhering material.

3. The method as defined in claim 1, wherein said step of applying includes first applying a first sized highly reflective granules to said top surface of said adhering material and subsequently applying a second sized highly reflective granules to said top surface of said adhering material, said first sized highly reflective granules having an average particle size that is greater than an average particle size of said second sized highly reflective granules.

4. The method as defined in claim 2, wherein said step of applying includes first applying a first sized highly reflective granules to said top surface of said adhering material and subsequently applying a second sized highly reflective granules to said top surface of said adhering material, said first sized highly reflective granules having an average particle size that is greater than an average particle size of said second sized highly reflective granules.

5. The method as defined in claim 3, wherein a size ratio of said average particle size of said first sized highly reflective granules to said average particle size of said second sized highly reflective granules is at least about 1.3:1.

6. The method as defined in claim 4, wherein a size ratio of said average particle size of said first sized highly reflective granules to said average particle size of said second sized highly reflective granules is at least about 1.3:1.

7. The method as defined in claim 1, wherein said highly reflective granules cover over about 98% of said top surface of said adhering material.

8. The method as defined in claim 6, wherein said highly reflective granules cover over about 98% of said top surface of said adhering material.

9. The method as defined in claim 1, wherein said highly reflective granules have an average reflectivity of about 60–99.9%.

10. The method as in claim 8, wherein said highly reflective granules have an average reflectivity of about 60–99.9%.

11. The method as defined in claim 1, wherein said highly reflective granules have an average opacity of about 60%–99%.

12. The method as defined in claim 10, wherein said highly reflective granules have an average opacity of about 60%–99%.

13. The method as defined in claim 1, wherein said highly reflective granules have an average porosity of about 0–5%.

14. The method as defined in claim 12, wherein said highly reflective granules have an average porosity of about 0–5%.

15. The method as defined in claim 1, including the step of continuously moving said roof or siding material along a path as said highly reflective granules are applied to said top surface of said adhering material.

16. The method as defined in claim 14, including the step of continuously moving said roofing or siding material along a path as said highly reflective granules are applied to said top surface of said adhering material.

17. The method as defined in claim 1, wherein said roofing or siding material includes a composite fabric.

18. The method as defined in claim 16, wherein said roofing or siding material includes a composite fabric.

19. The method as defined in claim 1, wherein a plurality of said highly reflective granules comprise silicon dioxide and over 50 weight percent aluminum oxide and having a weight percent ratio of aluminum oxide to silicon dioxide of about 0.8–10:1, and having an average reflectivity of at least about 55%, an average hardness of over about 4 Moh's hardness, and an average porosity of less than about 15%.

20. The method as defined in claim 18, wherein a plurality of said highly reflective granules comprise silicon dioxide and over 50 weight percent aluminum oxide and having a weight percent ratio of aluminum oxide to silicon dioxide of about 0.8–10:1, and having an average reflectivity of at least about 55%, an average hardness of over about 4 Moh's hardness, and an average porosity of less than about 15%.

21. The method as defined in claim 1, wherein a plurality of said highly reflective granules comprise silicon dioxide and at least about 94 weight percent aluminum oxide and having a weight percent ratio of aluminum oxide to silicon dioxide of about 15–8000:1, and having an average reflectivity of at least about 55%, an average hardness of over about 4 Moh's hardness, and an average porosity of less than about 15%.

22. The method as defined in claim 18, wherein a plurality of said highly reflective granules comprise silicon dioxide and at least about 94 weight percent aluminum oxide and having a weight percent ratio of aluminum oxide to silicon dioxide of about 15–8000:1, and having an average reflectivity of at least about 55%, an average hardness of over about 4 Moh's hardness, and an average porosity of less than about 15%.

23. The method as defined in claim 1, wherein a plurality of said highly reflective granules comprise crushed porcelain, said porcelain including silicon dioxide and at least about 25 weight percent aluminum oxide and having a weight percent ratio of aluminum oxide to silicon dioxide of at least about 0.2:1, and having an average reflectivity of at least about 55%, an average hardness of over about 4 Moh's hardness, and an average porosity of less than about 15%.

24. The method as defined in claim 18, wherein a plurality of said highly reflective granules comprise crushed porcelain, said porcelain including silicon dioxide and at least about 25 weight percent aluminum oxide and having a weight percent ratio of aluminum oxide to silicon dioxide of at least about 0.2:1, and having an average reflectivity of at least about 55%, an average hardness of over about 4 Moh's hardness, and an average porosity of less than about 15%.

25. A method of coating highly reflective granules on an adhering material of a roofing or siding material to form a roofing or siding material having an average resulting reflectivity on an upper surface of at least about 50% comprising:
   a) selecting highly reflective granules, at least a majority of said highly reflective granules are substantially white colored and have an average reflectivity of about 55–99.9%, an average hardness of over about 4 Moh's, an average opacity of about 60–99%, and an average porosity of about 0–5%;
   b) applying said highly reflective granules substantially uniformly on said adhering material until over about 95% of a top surface of said adhering material is covered by said highly reflective granules, said adhering material including asphalt, bitumen, or combinations thereof; and,
   c) partially embedding a majority of said plurality of highly reflective granules in said top surface of said adhering material to prevent most of said highly reflective granules from being fully embedded in said upper surface so that said highly reflective granules achieve an average resulting reflectivity on said upper surface of at least about 50%.

26. The method as defined in claim 25, wherein said step of applying includes dropping a first sized highly reflective granules to said top surface of said adhering material and subsequently applying a second sized highly reflective granules to said top surface of said adhering material, both of said sized particles being dropped from a height that only causes said partial embedding of most of said highly reflective granules in said top surface of said adhering material, said first sized highly reflective granules having an average particle size that is greater than an average particle size of said second sized highly reflective granules such that a size ratio of said average particle size of said first sized highly reflective granules to said average particle size of said second sized highly reflective granules is at least about 1.3:1.

27. The method as defined in claim 25, wherein said highly reflective granules cover over about 98% of said top surface of said adhering material.

28. The method as defined in claim 26, wherein said highly reflective granules cover over about 98% of said top surface of said adhering material.

29. The method as defined in claim 27, including the step of continuously moving said roof or siding material along a path as said highly reflective granules are applied to said top surface of said adhering material.

30. The method as defined in claim 28, including the step of continuously moving said roofing or siding material along a path as said highly reflective granules are applied to said top surface of said adhering material.

31. The method as defined in claim 25, wherein said roofing or siding material includes a composite fabric.

32. The method as defined in claim 30, wherein said roofing or siding material includes a composite fabric.

33. The method as defined in claim 25, wherein a plurality of said highly reflective granules comprise silicon dioxide and over 50 weight percent aluminum oxide and having a weight percent ratio of aluminum oxide to silicon dioxide of about 0.8–10:1, and having an average reflectivity of at least about 55%, an average hardness of over about 4 Moh's hardness, and an average porosity of less than about 15%.

34. The method as defined in claim 32, wherein a plurality of said highly reflective granules comprise silicon dioxide and over 50 weight percent aluminum oxide and having a weight percent ratio of aluminum oxide to silicon dioxide of about 0.8–10:1, and having an average reflectivity of at least about 55%, an average hardness of over about 4 Moh's hardness, and an average porosity of less than about 15%.

35. The method as defined in claim 25, wherein a plurality of said highly reflective granules comprise silicon dioxide and at least about 94 weight percent aluminum oxide and having a weight percent ratio of aluminum oxide to silicon dioxide of about 15–8000:1, and having an average reflectivity of at least about 55%, an average hardness of over about 4 Moh's hardness, and an average porosity of less than about 15%.

36. The method as defined in claim 32, wherein a plurality of said highly reflective granules comprise silicon dioxide and at least about 94 weight percent aluminum oxide and having a weight percent ratio of aluminum oxide to silicon dioxide of about 15–8000:1, and having an average reflectivity of at least about 55%, an average hardness of over about 4 Moh's hardness, and an average porosity of less than about 15%.

37. The method as defined in claim 25, wherein a plurality of said highly reflective granules comprise crushed porcelain, said porcelain including silicon dioxide and at least about 25 weight percent aluminum oxide and having a weight percent ratio of aluminum oxide to silicon dioxide of at least about 0.2:1, and having an average reflectivity of at least about 55%, an average hardness of over about 5 Moh's hardness, and an average porosity of less than about 10%.

38. The method as defined in claim 32, wherein a plurality of said highly reflective granules comprise crushed porcelain, said porcelain including silicon dioxide and at least about 25 weight percent aluminum oxide and having a weight percent ratio of aluminum oxide to silicon dioxide of at least about 0.2:1, and having an average reflectivity of at least about 55%, an average hardness of over about 5 Moh's hardness, and an average porosity of less than about 10%.

39. The method as defined in claim 25, wherein said highly reflective granules comprise:
$Al_2O_3$ at least about 45 weight percent
$SiO_2$ up to about 54 weight percent
$Fe_2O_3$ up to about 0.5 weight percent
CaO up to about 0.1 weight percent
MgO up to about 0.1 weight percent
$TiO_2$ up to about 0.8 weight percent
$Na_2O$ up to about 0.05 weight percent
$K_2O$ up to about 0.03 weight percent.

40. The method as defined in claim 32, wherein said highly reflective granules comprise:
$Al_2O_3$ at least about 45 weight percent
$SiO_2$ up to about 54 weight percent
$Fe_2O_3$ up to about 0.5 weight percent
CaO up to about 0.1 weight percent
MgO up to about 0.1 weight percent
$TiO_2$ up to about 0.8 weight percent
$Na_2O$ up to about 0.05 weight percent
$K_2O$ up to about 0.03 weight percent.

41. The method as defined in claim 25, wherein said highly reflective granules comprise:
$Al_2O_3$ about 45–74 weight percent
$SiO_2$ about 20–52 weight percent
$Fe_2O_3$ about 0.3–1.3 weight percent
CaO up to about 0.1 weight percent
MgO up to about 0.1 weight percent
$TiO_2$ up to about 3 weight percent
$Na_2O+K_2O$ up to about 0.65 weight percent.

42. The method as defined in claim 32, wherein said highly reflective granules comprise:
$Al_2O_3$ about 45–74 weight percent
$SiO_2$ about 20–52 weight percent
$Fe_2O_3$ about 0.3–1.3 weight percent
CaO up to about 0.1 weight percent
MgO up to about 0.1 weight percent
$TiO_2$ up to about 3 weight percent
$Na_2O+K_2O$ up to about 0.65 weight percent.

43. The method as defined in claim 25, wherein said highly reflective granules comprise:
$Al_2O3$ at least about 94 weight percent
$SiO_2$ up to about 0.1 weight percent
$Fe_2O_3$ up to about 0.15 weight percent
CaO up to about 0.12 weight percent
$Na_2O$ up to about 0.35 weight percent.

44. The method as defined in claim 32, wherein said highly reflective granules comprise:
$Al_2O3$ at least about 94 weight percent
$SiO_2$ up to about 0.1 weight percent
$Fe_2O_3$ up to about 0.15 weight percent
CaO up to about 0.12 weight percent
$Na_2O$ to about 0.35 weight percent 45. The method as defined in claim 25, wherein said highly reflective granules comprise:
$Al_2O_3$ at least about 99 weight percent
$SiO_2$ up to about 0.1 weight percent
$Fe_2O_3$ up to about 0.15 weight percent
CaO up to about 0.12 weight percent
$Na_2O$ up to about 0.35 weight percent 46. The method as defined in claim 32, wherein said highly reflective granules comprise:
$Al_2O3$ at least about 99 weight percent
$SiO_2$ up to about 0.1 weight percent
$Fe_2O_3$ up to about 0.15 weight percent
CaO up to about 0.12 weight percent
$Na_2O$ up to about 0.35 weight percent 47. The method as defined in claim 25, wherein said highly reflective granules are non-coated granules having a generally white color.

48. The method as defined in claim 32, wherein said highly reflective granules are non-coated granules having a generally white color.

49. The method as defined in claim 38, wherein said highly reflective granules are non-coated granules having a generally white color.

50. The method as defined in claim 36, wherein said highly reflective granules are non-coated granules having a generally white color.

51. The method as defined in claim 34, wherein said highly reflective granules are non-coated granules having a generally white color.

52. The method as defined in claim 40, wherein said highly reflective granules are non-coated granules having a generally white color.

53. The method as defined in claim 42, wherein said highly reflective granules are non-coated granules having a generally white color.

54. The method as defined in claim 44, wherein said highly reflective granules are non-coated granules having a generally white color.

* * * * *